United States Patent
Venkatachary et al.

(10) Patent No.: US 6,212,184 B1
(45) Date of Patent: Apr. 3, 2001

(54) FAST SCALEABLE METHODS AND DEVICES FOR LAYER FOUR SWITCHING

(75) Inventors: Srinivasan Venkatachary, St. Louis; Subhash Suri, Clayton; George Varghese, St. Louis, all of MO (US); Marcel Waldvogel, Winterhur (CH); Hari Adiseshu, University City, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/115,886

(22) Filed: Jul. 15, 1998

(51) Int. Cl.$^7$ .................................................. H04L 12/56
(52) U.S. Cl. .......................................... 370/392; 370/238
(58) Field of Search .................................... 370/238, 408, 370/392, 401, 393, 402, 403, 404, 405, 466, 467; 711/202, 216; 709/239, 241; 340/825.02; 714/819

(56) References Cited

U.S. PATENT DOCUMENTS

| | | | |
|---|---|---|---|
| 3,701,111 | 10/1972 | Cocke et al. ...................... 340/172.5 |
| 4,464,650 | 8/1984 | Eastman et al. .............. 340/347 DD |
| 5,202,986 | * 4/1993 | Nickel ................................. 395/600 |
| 5,440,546 | 8/1995 | Bianchini, Jr. et al. ............. 370/413 |
| 5,446,887 | 8/1995 | Berkowitz ........................... 370/392 |
| 5,613,069 | 3/1997 | Walker ................................ 370/355 |
| 5,651,002 | 7/1997 | Van Seters et al. ................. 370/392 |
| 5,781,772 | * 7/1998 | Wilkinson, III et al. ............ 395/600 |
| 5,787,430 | * 7/1998 | Doeringer et al. .................. 707/100 |
| 5,946,679 | * 8/1999 | Ahuja et al. ............................. 703/7 |
| 6,011,795 | * 1/2000 | Varghese et al. .................... 370/392 |
| 6,014,659 | * 1/2000 | Wilkinson, III et al. .............. 707/3 |
| 6,023,501 | * 2/2000 | Wakamatsu .......................... 379/114 |
| 6,052,683 | * 4/2000 | Irwin ...................................... 707/8 |
| 6,067,574 | * 4/2000 | Tzeng .................................. 709/247 |
| 6,097,725 | * 8/2000 | Glaise et al. ........................ 370/395 |

* cited by examiner

*Primary Examiner*—Douglas Olms
*Assistant Examiner*—Ken Vanderpuye
(74) *Attorney, Agent, or Firm*—Howell & Haferkamp, LC

(57) ABSTRACT

Fast, scalable methods and devices are provided for layer four switching in a router as might be found in the Internet. In a first method, a grid of tries, which are binary branching trees, is constructed from the set of routing filters. The grid includes a dest-trie and a number of source tries. To avoid memory blowup, each filter is stored in exactly one trie. The tries are traversed to find the lowest cost routing. Switch pointers are used to improve the search cost. In an extension of this method, hash tables may be constructed that point to grid-of-tries structures. The hash tables may be used to handle combinations of port fields and protocol fields. Another method is based on hashing, in which searches for lowest cost matching filters take place in bit length tuple space. Rectangle searching with precomputation and markers are used to eliminate a whole column of tuple space when a match occurs, and to eliminate the rest of a row when no match is found. Various optimizations of these methods are also provided. A router incorporating memory and processors implementing these methods is capable of rapid, selective switching of data packets on various types of networks, and is particularly suited to switching on Internet Protocol networks.

28 Claims, 15 Drawing Sheets

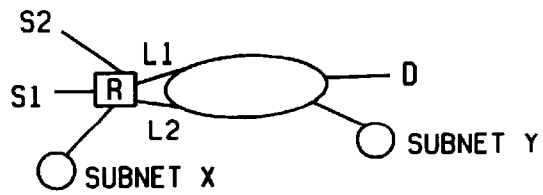
FIG. 1A
DATABASE AT ROUTER R
| TO | FROM | TRAFFIC TYPE | FORWARDING DIRECTIVE |
|----|------|--------------|----------------------|
| D  | S1   | VIDEO        | FORWARD VIA L1       |
| ✕  | S2   | ✕            | DROP ALL TRAFFIC     |
| Y  | X    | ✕            | RESERVE 50 Mbps      |
FIG. 1B
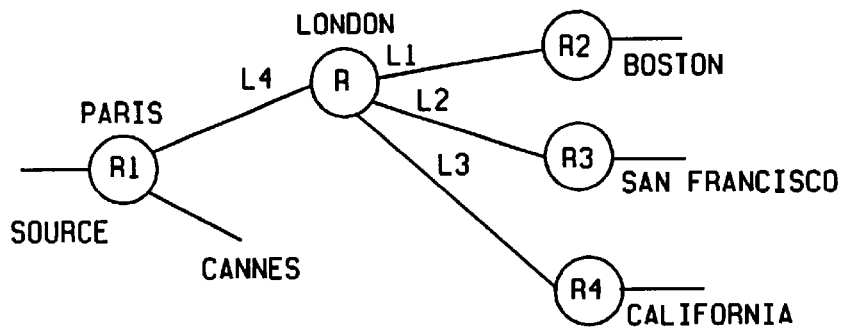
FIG. 2
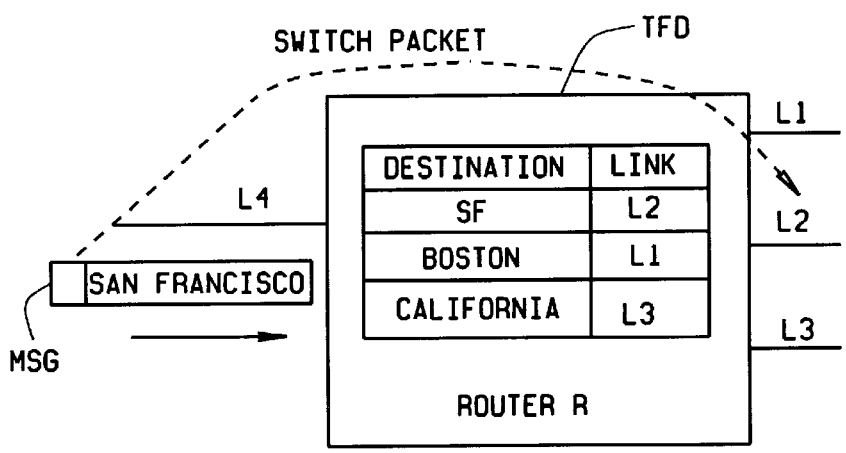
FIG. 3

| DESTINATION | LINK |
|---|---|
| USA | L1 |
| USA.CA.SF | L2 |
| USA.CA | L3 |

| |
|---|
| P1 = 10* |
| P2 = 111* |
| P3 = 11001* |
| P4 = 1* |
| P5 = 0* |
| P6 = 10110* |
| P7 = 101110* |
| P8 = 1011110* |

| DESTINATION 32 BITS | SOURCE 32 BITS | PROTOCOL 8 BITS | DEST PORT 16 BITS | SOURCE PORT 16 BITS |
|---|---|---|---|---|

| FILTER | DESTINATION | SOURCE |
|---|---|---|
| $F_1$ | 0* | 10* |
| $F_2$ | 0* | 01* |
| $F_3$ | 0* | 1* |
| $F_4$ | 00* | 1* |
| $F_5$ | 00* | 11* |
| $F_6$ | 10* | 1* |
| $F_7$ | * | 00* |

| FILTER | DESTINATION | SOURCE |
|---|---|---|
| $F_1$ | $D_1$ | * |
| $F_2$ | $D_2$ | * |
| ⋮ | ⋮ | ⋮ |
| $F_{N/2}$ | $D_{N/2}$ | * |
| $F_{N/2+1}$ | * | $S_1$ |
| $F_{N/2+2}$ | * | $S_2$ |
| ⋮ | ⋮ | ⋮ |
| $F_N$ | * | $S_{N/2}$ |

| FILTER | DESTINATION | SOURCE |
|---|---|---|
| $F_1$ | 0* | 10* |
| $F_2$ | 0* | 01* |
| $F_3$ | 0* | 1* |
| $F_4$ | 00* | 1* |
| $F_5$ | 00* | 11* |
| $F_6$ | 10* | 1* |
| $F_7$ | * | 00* |
| $F_8$ | * | 1* |
| $F_9$ | 1* | * |
| $F_{10}$ | 11* | * |
| $F_{11}$ | * | * |
FIG. 14
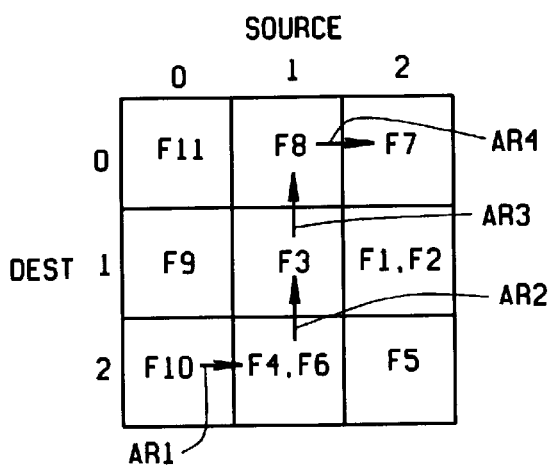
FIG. 15
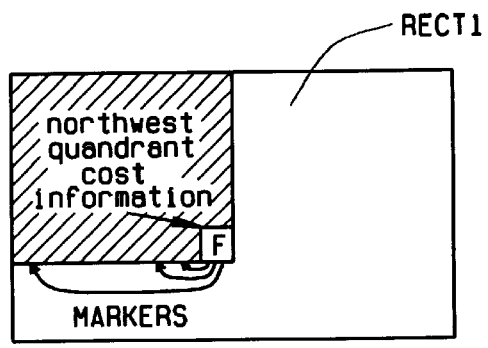
FIG. 16

```
Function RectangleSearch(H,T) (*search for header H
    in a R x C rectangle T*)
F :=nil;    (*initialize best filter found so far*)
cost:=∞   (*initialize lowest cost so far*)
(r,c):=(R,1)   (*start at lower left corner*)
while (r>0) adn (c<C) do
Tuple:=T(r,c);    (*The next tuple to search*)
Concatenate the first Tuple(i) bits of each field H(i) to form the key M
F':=Search(M,hashTable(Tuple));   (*search hash table for key M*)
if(F'=nil)   (*not found*)
  r:=r-1    (*move up to next row*)
else
  c:=c+1    (*move right to next column*)
  If(storedCost(F')<cost then
     F:=storedFilter(F');     (*update best filter found*)
     cost:=storedCost(F');    (*update smallest cost so far*)
endwhile
return F as lowest cost matching filter
```

FIG. 17

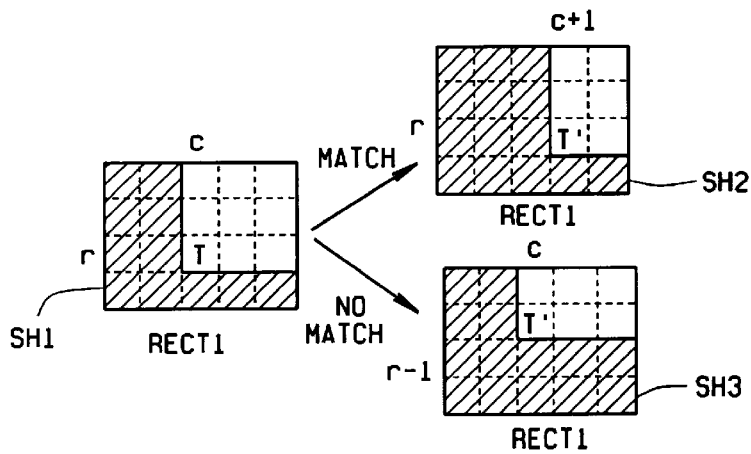

FIG. 18

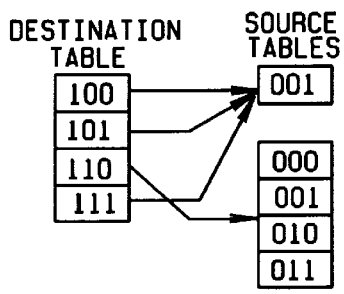

FIG. 19

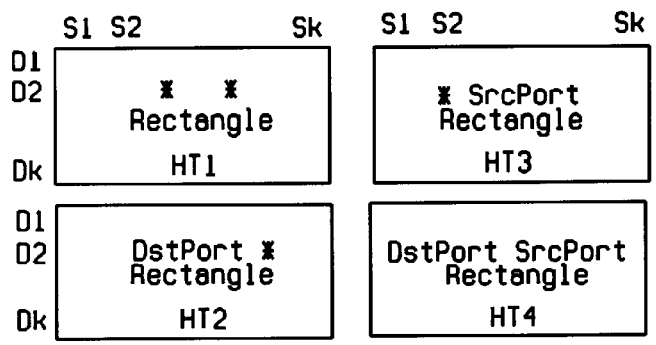
FIG. 20
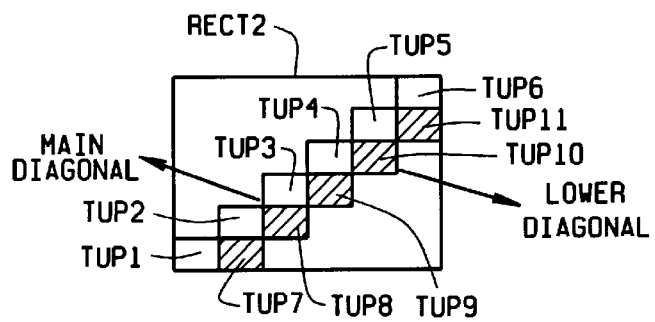
FIG. 21
FIG. 22
| | AON BASIC | AON OPTIMIZED | PREFIX BASIC | PREFIX+EXPANSION |
|---|---|---|---|---|
| PROCEDURE | 12 | 10 | 252 | 20 |
| LOWER BOUND | 11 | 10 | 248 | 16 |
FIG. 23

```
Function RectangleSearch2 (H,T) (*search for header H in
    a R x C rectangle T*)
F:=nil;     (*initialize best filter found so far*)
Rope.Col=1;     (*initialize rope*)
Rope.Rows=Decreasing order list of non-empty rows in column 1 of T;
cost:=∞     (*initialize lowest cost so far*)
while (Rope.Rows!=nil) and (c<C) do
  Let c=Rope.Col;
  Extract the row index at the head of RopeRows, say, r;
  Tuple:=T[r,c]
  Concatenate the first Tuple[i] bits of each field H[i] to form the key  M
  L:=Search(M,hashTable[Tuple]);     (*search for key M*)
  if (L!=nil)     (*found match*)
    Rope.Col=Rope[L].Col;
    Rope.Rows=Rope[L].Rows;
    if (storedCost(L)<cost then
      F:=storedFilter(L);     (*update best filter found*)
      cost:=storedCost(L);     (*update smallest cost so far*)
endwhile
Return F as lowest cost matching filter
```

FIG. 24

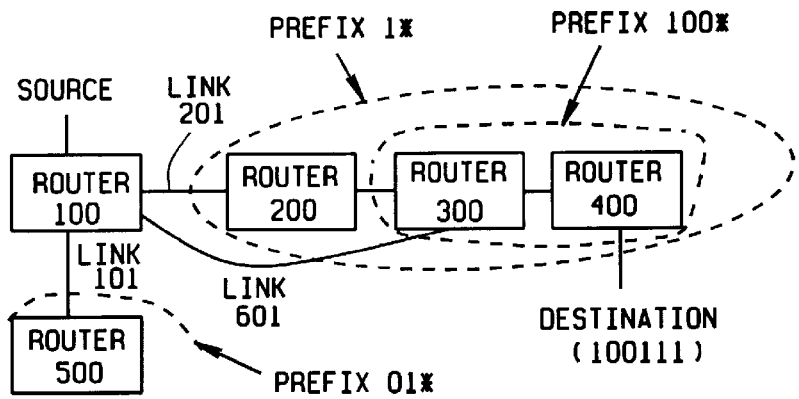

FIG. 25

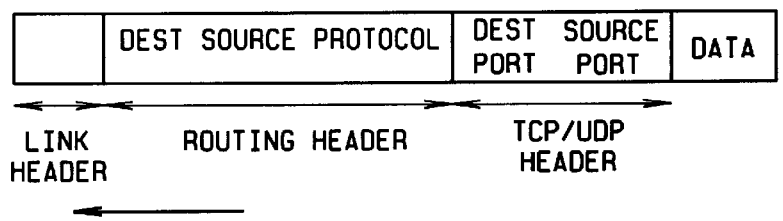

FIG. 26

FAST SCALEABLE METHODS AND DEVICES FOR LAYER FOUR SWITCHING

The U.S. Government has certain rights in this invention and patent as provided for by the terms of Grant NCR-9628145, awarded by the National Science Foundation.

BACKGROUND OF THE INVENTION

1. Field of the Invention

This invention relates to the field of electronic digital communication, and more specifically, to devices and methods for routing data packets.

2. Description of Related Art

With everyone building Web Sites, Internet usage has been expanding at a rate more commonly associated with nuclear reactions. Internet traffic is exploding because of a growing number of users as well as a growing demand for bandwidth intensive data. Multimedia applications, for instance, can easily consume megabytes of bandwidth. To keep up with increased traffic, link speeds in the Internet core have been increased to 622 Mbps, and a number of vendors are providing faster routers.

A traditional router performs two major tasks in forwarding a packet: looking up the packet's destination address in the router database, and switching the packet from an incoming link to one of the outgoing links. With recent advances such as those discussed in N. McKeown et al., "The Tiny Tera: A Packet Switch Core," *IEEE Micro*, January/February 1997, pp. 26–33, and J. Turner, "Design of a Gigabit ATM Switch," *Proc. SIGCOMM 97*, October, 1997, the task of switching is well understood, and most vendors use fast buses or crossbar switches. Several new algorithms have been developed recently for address lookup as well. See, for example, DegerMark et al., "Small Forwarding Tables for Fast Routing Lookups," *Computer Communication Review*, October, 1997; M. Waldvogel et al., "Scalable High Speed IP Routing Lookups," *Proc SIGCOMM 97*, October 1997; S. Nilsson et al., "Fast Address Look-Up for Internet Routers," *Proceedings of IEEE Broadband Communications 98*, April, 1998; and V. Srinivasan et al., "Faster IP Lookups using Controlled Prefix Expansion," *Proc. ACM Sigmetrics 98*, June 1998. Thus it would appear that there is no inherent impediment to building Gigabit routers for traditional data forwarding in the Internet.

Increasingly, however, users are demanding, and some router vendors are providing, a more discriminating form of router forwarding. This new vision of forwarding is called Layer 4 Forwarding because routing decisions can be based on headers available at Layer 4 or higher in the OSI architecture. Layer 4 Switching offers increased flexibility: it gives a router the capability to block traffic from a dangerous external site, to reserve bandwidth for traffic between two company sites, and to give preferential treatment to one kind of traffic (e.g., online database transactions) over other kinds (e.g., Web browsing). Layer 4 switching is sometimes referred to in the vendor literature by the phrase "service differentiation". Traditional routers do not provide service differentiation because they treat all traffic going to a particular Internet address in the same way. Layer 4 Switching allows service differentiation because the router can distinguish traffic based on origin (source address) and application type (e.g., web traffic vs. file transfer).

Layer 4 Switching, however, does not come without some difficulties. First, a change in higher layer headers will require reengineering the routers, which is why routers have traditionally used only Layer 3 headers. Second, when data is encrypted for security, it is not clear how routers can get access to higher layer headers.

Despite these difficulties, several variants of the Layer 4 switching have already evolved in the industry. First, many routers implement firewalls (see W. Cheswick et al., "Firewalls and Internet Security," Addison-Wesley, 1995) at trust boundaries, such as the entry and exit points of a corporate network. A firewall database consists of a series of packet filters that implement security policies. A typical policy may be to allow remote login from within the corporation, but to disallow it from outside the corporation. Second, the need for predictable and guaranteed service has led to proposals for reservation protocols like RSVP (L. Zhang et al., "RSVP: A New Resource Reservation Protocol, *IEEE Networks Magazine*, September 1993) that reserve bandwidth between a source and a destination. Third, the cries for routing based on traffic type have become more strident recently—for instance, the need to route web traffic between Site 1 and Site 2 on say Route A and other traffic on say Route B. FIGS. 1A and 1B illustrate some of these examples.

These figures schematically illustrate filters that provide traffic sensitive routing, a firewall rule, and resource reservation. The first filter routes video traffic from S1 to D via L1; not shown is the default routing to D which is via L2. The second filter blocks traffic from an experimental site S2 from accidentally leaving the site. The third filter reserves 50 Mbps of traffic from an internal network X to an external network Y, implemented perhaps by forwarding such traffic to a special outbound queue that receives special scheduling guarantees; here X and Y are prefixes.

Once users have gotten used to the flexibility and features provided by firewalls, traffic reservations, and QoS (Quality of Service) routing, it is hard to believe that future routers can ignore these issues. On the other hand, it seems clear that the ad hoc solutions currently being deployed are not the best, and cleaner and more general techniques are possible. For example, a cleaner solution to the traffic sensitive routing and reservation problem would be to push some form of "traffic classifier" into the routing header to determine application requirements without inspecting higher layer headers. But whatever the final solutions will be, it seems clear that future routers will need to forward at least some traffic based on a combination of destination address, source address and some other classifier fields, whether they are in the routing (Layer 3) or higher layer (Layers 4 and up) headers.

A typical database today contains only a few (10–100 typically) filters. However, if we consider that typical backbone routers now have 40,000 prefixes, and if we qualify each destination prefix with even a few port numbers (e.g., for QoS routing) or source prefixes (e.g., for resource reservation between sites in a Virtual Private Network), it is not hard to imagine the need for several hundred thousand filters. Today, even firewall processing with 10–100 filters is generally slow because of linear search through the filter set, but is considered an acceptable price to pay for "security". Thus the problem of finding the best matching filter for up to 100K filters at Gigabit speeds is an important challenge.

In traditional message forwarding in an Internet router, each router maintains a forwarding database, which is consulted by the router to determine the outgoing link on which the message is forwarded. The computational problem of determining the outgoing link based on the message's address is called the address lookup problem.

Consider a hypothetical fragment of the Internet linking users in Europe with users in the United States. If a user in Paris, named Source, as shown on the left in FIG. 2, wants to send an email message to another user in San Francisco, then Source will send its message to a router R1, say, in Paris. The Paris router may send this message on the communication link L4 to router R in London. The London Router R may then send the message on link L2 to router R3 in San Francisco, and finally R3 sends the message to the destination user.

Thus, a message travels from source to destination alternating between communication links and routers, just like a postal letter travels from post office to post office using a communication channel (such as airplanes). The important question is: How does each post office decide where to forward the letter? The post offices make these forwarding decisions using the destination addresses on the letters. In the same way, routers make their forwarding decisions based on the Internet destination address that is placed in an easily accessible portion of the message called a header. Each router, thus, is a special computer whose job is to forward all incoming messages towards their final destinations. The router uses its forwarding database, which is a table TFD in the router's computer memory, listing each possible destination and the corresponding output link. FIG. 3 shows a schematic of router R's forwarding database. For instance, when a message MSG arrives on link L4, carrying the destination address San Francisco, the router R forwards the message to link L2.

While there are several tasks a router performs in forwarding a message, the address lookup is one of the major bottlenecks, and thus the subject of much current research. (The other tasks such as switching, etc., are better understood and have been optimized to satisfactory levels.) So, address lookup is a bottleneck at high speeds.

There are far too many different internet addresses for each router to keep in its database. While storing each destination address explicitly in the database may greatly simplify the lookup problem, the memory requirement for this scheme at each router will be impractically enormous. Furthermore, since the Internet is a dynamic entity, which is always changing and evolving, the database needs to be updated frequently (in some cases several thousand times a day). Updating a large database containing all internet addresses is also infeasible at such a high frequency.

Instead, the forwarding databases are organized using a concept called address prefixes. Consider FIG. 4 which provides a different, more geographical representation, of FIG. 2. The link L1 of router R is used to reach Boston as before, but Boston is also the "hub" for the entire USA—that is, we can reach any destination in the US from the hub router in Boston. Link L3 leads to California, from where a message can be sent directly to any location in California. Finally, we also have the direct link L2 from London to San Francisco.

This forwarding table compresses a very large number of table entries into one. For instance, while a naïve database will have to maintain a separate entry for each and every destination in the US (possibly several thousand), the scheme as represented FIG. 4 instead uses a default route, via Boston. In particular, all those cities in the US outside California (such as Denver, Kansas, Baltimore, St. Louis) do not need any explicit table entry—they are all reachable from London through Boston on link L1. Clearly, the reduction in the database size can be (and is) dramatic.

More specifically, the router database stores address prefixes, as in FIG. 5. The first entry is the default route for any US city, which is specified using the notation USA.*. Any city in California is specified as USA.CA.*, while San Francisco is written as USA.CA.SF. So, we have specified the whole forwarding database for router R in FIG. 2 using just 3 entries, rather than one per city in the US. Of course, now to send a message to San Francisco, we need to use the address USA.CA.SF, and not just SanFrancisco, but this is easy to do.

While the use of prefixes greatly reduces the memory needed to store the database, it makes the lookup problem more complicated. For one thing, an address can match multiple prefixes. If that happens, it should be intuitively clear that the forwarding should occur using the most specific or the longest prefix match. Thus a packet addressed to USA.CA.SF matches USA.*, USA.CA.*, as well as USA.CA.SF, but it should be forwarded to link L2 associated with the longest match USA.CA.SF. See FIG. 4. (This is because we have a direct link to San Francisco and should use it in place of a more indirect route through Boston.) A packet with address USA.CA.LA matches USA.* and USA.CA.*, but not USA.CS.SF. In this case, the most specific match is USA.CA.* and so the packet should be forwarded to the link L3.

In summary, routers achieve enormous savings in table size by compressing several address entries into one, with the use of prefixes. Unfortunately, this benefit comes with a price, in that the routers must now do the address lookup by solving a much more difficult problem, referred to as the longest matching prefix problem.

Thus when a message to San Francisco arrives on link L4, router R looks up the destination address SanFrancisco in its forwarding table. Since the table says L2, the router then switches the entire message to the output link L2. It then proceeds to service the next arriving message. Notice that so far the word "lookup" is no different from looking up a word in a dictionary or a phone number in the phone book.

Thus the two main functions of a traditional router are to lookup destination addresses (address lookup) and then to send the packet to the right output link (message switching). Both must be done at very high speeds. However, the Internet lookup problem is a lot harder than looking up a phone number in a phone book, or a word in a dictionary. In those problems, we can search quite rapidly by first sorting all the words or names. Once sorted, if we are looking for a word starting with Sea, we simply go to the pages of S entries and then look for words starting with Sea, etc. Clearly, such lookup is a lot faster than looking up all entries in a dictionary. In fact, such lookup is called exact matching lookup; standard solutions based on hashing and binary search provide very fast times for exact matching. The Internet lookup problem is a lot harder than dictionary search because Internet routers store address prefixes in their forwarding tables to reduce the size of their tables. However, the use of such address prefixes makes the lookup problem one of longest matching prefix instead of exact matching. The longest matching prefix problem is a lot harder. Before we explain why, let us digress briefly and explain why routers store prefixes in their tables.

While we used English words as addresses for illustration in the lookup example, in reality the Internet addresses are strings of bits. Each bit is either 0 or 1; a bit string is a sequence of bits; and the length of a string is the number of bits in it. For instance, 1011 is a string of length 4 and 1010100 is a string of length 7. Internet addresses come in two types. The current Internet (IPv4, for Internet Protocol, version 4) uses addresses that are bit strings of length 32. We often say that IPv4 uses 32 bit addresses. The next generation of Internet (IPv6, for Internet Protocol, version 6) uses 128 bit addresses. We will see that the longer length of IPv6 addresses will only make the lookup problem more difficult for the routers.

Except for this cosmetic difference of bits versus English characters, the Internet address lookup problem is exactly the best matching prefix problem described above. To provide a more concrete example, let us consider the table of Internet address prefixes shown in FIG. 6.

Suppose we have a 32 bit IPv4 destination address whose first 6 bits are 101100. In this case, the best matching prefix is Prefix P6 (10110*); there are two other matches, namely P1, P4, but prefix P6 is the longest. Thus, any message to such a destination address should be sent to the output link corresponding to P6.

Traditional routing, using destination address only, is sufficient for delivering Internet messages to their intended destinations, but it does not allow a router to distinguish between different kinds of messages going to the same address, say, D. For instance, casual web surfing to address D may be less important than access to a company database at the same address. A network manager may wish to give more preferential treatment to the latter traffic (such as more bandwidth or less congested routes) than to the former.

Layer 4 Switching allows such differentiated service by using additional header fields in making forwarding decisions. In particular, it performs the best matching prefix lookup on a combination of several header fields, such as destination address, source address, and application port numbers. This combination of various fields is called a packet filter. Otherwise, the general routing framework remains the same—there is an output link associated with the best matching filter and the message is switched to that output link. Packet filters come with two additional features. First, there may be a "block" characteristic associated with the filter, which causes any message matching this filter to be dropped (not be forwarded); this is useful for security and firewalls. Second, a filter may specify a special output queue for the corresponding link, which can be used to reserve bandwidth for certain types of messages.

Thus, having the message forwarding (lookup) depend on additional fields, especially those describing application type sending the message, allows us to provide differential service. However, we first need to understand the format of an Internet message and describe the relevant fields that can affect message forwarding. Besides the destination address (the computer the message is going to) used in traditional Internet forwarding, there are at least four additional important fields: Internet Source address (the computer that sent this message), Protocol Classifier (the type of Internet service requested by the message), Destination Port number (the extension of the Process within the Destination Computer that should handle this message), and Source Port number (the extension of the Process within the Source Computer that sent this message). See FIG. 7, which shows these fields in an Internet message. It will be recognized, however, that the invention described herein is applicable to other protocols as well; the Internet is used only for illustration. Also, the invention is not limited for use with these specific fields, and can use other fields, including application layer fields such as Web URLs (uniform resource locators). The 5 fields used for illustrative purposes are probably of the most immediate interest, however, and will be used for many of our examples.

The Destination Address is the Internet address of the destination computer to which the message is being sent. The Source Address is the Internet Address of the computer that sent the message. The Protocol field describes the Internet protocol type of this message. The two most common ones are the Transmission Control Protocol (TCP) and the User Datagram Protocol (UDP). By way of analogy, TCP corresponds to certified mail with return receipt (offering reliability), while UDP corresponds to ordinary mail. Some applications prefer the more reliable TCP service, while others prefer the cheaper (albeit less reliable) UDP service.

For some security-sensitive applications, it is helpful to recognize messages containing TCP acknowledgments (analogous to the return receipt of a certified mail) and to treat them differently. Thus, in our examples, we will sometimes have a third type of Protocol value called "TCP-ACK," which is a TCP message with an acknowledgment in it. There are also other types of less commonly used Internet protocols. We will not use these protocols in our examples, but it will become clear upon study of the detailed description and the figures that the present invention can handle arbitrary values of the Protocol field.

Both the TCP and UDP protocols also define so-called Destination and Source Port numbers, which can be thought of as telephone extensions. When you call, say, the Acme Widget Company at 314-555-1234, the accounting department may have Extension 12 and the sales department may have Extension 15. So, you dial 12 if you wish to settle your bills, and dial 15 to buy more widgets. Similarly, within a given Internet computer, a destination port number represents the "extension" of the process (application program) that should receive a message, and source ports represent the "extension" of the process that originated the message.

In terms of the format, the Destination and Source addresses are 32 bit strings, the Protocol field is an 8 bit string, and the Destination and Source Ports are 16 bit strings. (See FIG. 7.) We will often refer to a specific port number as an integer. For example, if we say the Destination Port is 23, we mean that it is the 16 bit string that encodes the integer 23. Similarly, when we say that the Protocol Field is TCP-ACK, we mean that the corresponding bit string in the message encodes this value.

Port numbers are important because they can tell a router the type of application that is sending this message. For instance, most electronic mail programs use a protocol called SMTP in which mail is sent to Destination Port 25. Most file transfer occurs using a protocol called FTP, which uses Destination Ports 20 or 21. The World Wide Web, by far the most common application, sends messages to Destination Port 80 (but occasionally also to other easily recognized substitutes like 81, 800, 8000, or 8080). Thus, by simply giving more bandwidth to messages addressed to Port 25 than to Port 80, we can give preference to electronic mail over Web Traffic. Similarly, replies sent by Web Servers have Source Port 80, which allows us to distinguish such traffic.

The Protocol field is also important because certain Internet applications use TCP, while others use UDP, which allows us to distinguish between applications. Finally, the source address has obvious significance when we want to give preferential treatment to traffic depending on its origin.

Consider, for example, a company network that has two subnetworks, a corporate subnetwork and an engineering subnetwork. The company may choose to give priority to traffic originating from the corporate network. This is easily done, because in the Internet addressing scheme, all the addresses that are in the Corporate subnetwork will have a common prefix, say, P, while the engineering network addresses begin with a different prefix, say, Q. So, giving more bandwidth to traffic with source addresses matching the prefix P accomplishes the desired goal of assigning higher priority to the corporate subnet.

As a second example, suppose a university has traced several computer hacking incidents to a particular dormitory network (say, source address prefix R). The campus administrator may decide to restrict traffic from that dormitory network to only electronic mail. We can accomplish this by creating a packet filter that disallows any messages originating from the dormitory (source addresses that match R) whose destination port is not 25.

These examples shows that the decision on how to forward a message can depend on several fields in the message. In general, it can depend on a combination of the five fields we described or even others. Each combination of fields for which a manager (or a routing protocol) requires special treatment needs to be specified by a rule or a filter. Any fields that are irrelevant in a rule can be wildcarded (specified using the "don't care" character "*").

For example, the two rules for handling the dormitory network could be as follows. Rule 1 could be of the form "If the Destination Address=*, the Source Address matches Prefix S, the Protocol Field is TCP, the Destination Port is 25 and the Source Port is *, then forward the message based on the Destination Address." Rule 2 could be of the form, "If the Destination Address=*, the Source Address matches Prefix S, the Protocol Field is TCP, the Destination Port is *, and the Source Port is *, then drop the message".

The intent of the second rule is to drop all messages sent from the dormitory network for purposes other than email. However, a message sent from the dorm for email can match both rules, thus, the Rules conflict. Rule 1 says forward the message, Rule 2 says drop the message. The solution is to give each rule a unique priority or cost. When multiple rules match a message, the message is forwarded according to the lowest cost matching Rule. Thus in our example, if Rule 1 is given a lower cost than Rule 2, email from the dorm will indeed be allowed through.

In most firewall databases, the rules are listed in a linear order: the cost of a rule is equal to its position in the order. Thus the lowest cost rule is the first rule in the database that matches the message. In the general Layer 4 Switching problem, there may be a more general notion of cost. Thus, each rule or filter has an arbitrary cost, and the lookup problem is to find the least cost matching filter.

Each rule could specify an exact match on a field (such as "Protocol=TCP"), a prefix match (such as "source addresses matching the Dormitory subnetwork S"), or a range match (such as "port numbers in the range 1024–64,000"). Port ranges are especially useful for firewall applications because some applications cannot be identified by a single port number but by a range of port numbers—for example, outgoing remote login can use any port number greater than 1023. We now describe the filter matching problem more precisely.

Traditionally, the rules for classifying a message are called filters, and the Layer 4 Switching problem is to determine the lowest cost matching filter for each incoming message at a router.

We assume that the information relevant to a lookup is contained in K distinct header fields in each message. These header fields are denoted H[1], H[2], . . . , H[K], where each field is a string of bits. For instance, the relevant fields for an IPv4 packet could be the Destination Address (32 bits), the Source Address (32 bits), the Protocol Field (8 bits), the Destination Port (16 bits), the Source Port (16 bits), and TCP flags (8 bits). The number of relevant TCP flags is limited, and so we prefer to combine the protocol and TCP flags into one field—for example, we can use TCP-ACK to mean a TCP packet with the ACK bit set. (TCP flags are important for packet filtering because the first packet in a connection does not have the ACK bit set while the others do. This allows a simple rule to block TCP connections initiated from the outside while allowing responses to internally initiated connections.) Other relevant TCP flags can be represented similarly; UDP packets are represented by H[3]=UDP.

Thus, the combination (D, S, TCP-ACK, 63, 125), denotes the header of an IP packet with destination D, source S, protocol TCP, destination port 63, source port 125, and the ACK bit set.

The filter database of a Layer 4 Router consists of a finite set of filters, $F_1, F_2 \ldots F_N$. Each filter is a combination of K values, one for each header field. Each field in a filter is allowed three kinds of matches: exact match, prefix match, or range match. (It is possible to extend the type of matches for greater flexibility, but the examples presented herein use these three most common types.) In an exact match, the header field of the packet should exactly match the filter field—for instance, this is useful for protocol and flag fields. In a prefix match, the filter field should be a prefix of the header field—this could be useful for blocking access from a certain subnetwork. In a range match, the header values should lie in the range specified by the filter—this can be useful for specifying port number ranges.

Each filter $F_i$ has an associated directive $act_i$, which specifies how to forward the packet matching this filter. The directive specifies if the packet should be blocked. If the packet is to be forwarded, the directive specifies the outgoing link to which the packet is sent, and perhaps also a queue within that link if the message belongs to a flow with bandwidth guarantees.

We say that a packet P matches a filter F if each field of P matches the corresponding field of F—the match type is implicit in the specification of the field. For instance, if the destination field is specified as 1010*, then it requires a prefix match; if the protocol field is UDP, then it requires an exact match; if the port field is a range, such as 1024–1100, then it requires a range match. For instance, let F=(1010*, *, TCP, 1024–1080, *) be a filter, with act=block. Then, a packet with header (10101 . . . 111, 11110 . . . 000, TCP, 1050, 3) matches F, and is therefore blocked. The packet (10110 . . . 000, 11110 . . . 000, TCP, 80, 3), on the other hand, does not match F.

Since a packet may match multiple filters in the database, we associate a cost for each filter to determine an unambiguous match. So each filter F in the database is associated with a non-negative number, cost(F), and our goal is to find the filter with the least cost matching a packet's header. Our cost function generalizes the implicit precedence rules that are often used in practice to choose between multiple matching filters. In firewall applications, for instance, rules or filters are placed in the database in a specific linear order, where each filter takes precedence over a subsequent filter. Thus, the goal there is to find the first matching filter. Of course, we can get the same effect in our invention by making cost (F) equal the position number of F in the database.

Several existing firewall implementations do a linear search of the database and keep track of the best matching filter. Some implementations use caching to improve performance—they cache full packet headers to speed up the processing of future lookups. The cache hit rate of caching full IP addresses in routers is at most 80–90% (C. Partridge, "Locality and Route Caches," in *NSF Workshop on Internet Statistics Measurement and Analysis,* San Diego, Calif., February 1996; P. Newman et al., "IP Switching and Gigabit Routers," *IEEE Communications Magazine,* January 1997) and cache hit rates are likely to be much worse for caching full headers. Incurring a linear search cost to search through 100,000 filters is a bottleneck even if it occurs on only 10 to 20% of the packets.

The least cost matching filter can be thought of as a special case of a very general multidimensional searching problem. Several general solutions exist for the problem. In particular, each K-field filter can be thought of as a K-dimensional rectangular box, and each packet header can be thought of as a point in the K-dimensional space. The least cost filter matching problem is to find the least cost box containing the header point. A general result in Computational Geometry offers a data structure requiring $O(N(\log N)^{K-1})$ space, and search time $O((\log N)^{K-1})$, where the logarithms are to the base 2 (for instance, see Section 2.3 in F. P. Preparata et al., *Computational Geometry: An Introduction,* Springer-Verlag, New York, N.Y. 1985). Unfortunately, the worst-case search and memory costs of this data structure are infeasible, even for modest values of N and K. For instance, when N=10,000 and K=4, the worst-case search cost is at least $13^3$=2197 and the memory cost is 2197N.

Another possible technique is to generalize binary search by using quad-tree like construction in higher dimensions. (See, for instance, H. Samet, *The Design and Analysis of Spatial Data Structures,* Addison-Wesley, 1989.) Consider, for instance, destination-source filters, which correspond to a two-dimensional search. A filter F=(D, S) can be mapped to a quad-tree cell (i, j) if D is i bits long and S is j bits long. Now, we can try to do a binary search by first matching the packet with the filters in the quad-tree cell (W/2, W/2), where W is the maximum bit length of any destination or source prefix. The problem is that the probe outcome (fail or match) only eliminates one quadrant of the search space, and requires three recursive calls (not one, as in 1 dimension) to finish the search, which leads to a large search time. One possible way to avoid making three recursive calls is to precompute future matches using markers, but that leads to an infeasible memory explosion of $2^{W/2}$. We have also shown a lower bound on hashing schemes as in M. Waldvogel et al., "Scalable High Speed IP Routing Lookups," *Proc. SIGCOMM 97,* October 1997, to show that they generalize poorly to multiple dimensions.

In summary, we believe that all known existing methods lead to either a large blowup in memory or lookup time for the least cost filter problem. It would therefore be advantageous to provide routers and routing methods that did not require either huge memory requirements or large lookup times.

BRIEF DESCRIPTION OF THE INVENTION

There is thus provided, in accordance with a first embodiment of the invention, a basic method for routing a data packet through an electronic routing device having an input data link and a plurality of output data links, the data packets having at least a first field and a second field, the method comprising: searching a first trie in a memory of the electronic routing device for a record containing a longest prefix match of a first field of the data packet, searching a second trie associated with the longest prefix matching record of the first trie for a record containing a lowest cost match of a second field of the data packet; and routing the data packet on an output data link corresponding to the lowest cost matching record. In accordance with a refinement of the method, the first trie may be a multi-bit trie.

There is provided, in accordance with a second embodiment of the invention, in which each record of a first trie corresponding to a prefix match of a first field of a data packet references an associated second trie containing only records corresponding to filters exactly matching the prefix match of the first field, a method comprising: (a) searching a first trie in a memory of the electronic routing device for a record containing a prefix match of a first field of the data packet, the record also containing a reference to an associated one of a plurality of second tries; (b) searching the associated second trie for a record containing a minimum cost match of a second field of the data packet, the record containing a reference to one of the output data links; (c) repeating steps (a) and (b) until all of the matching prefixes in the first trie and the corresponding minimum cost matches of the second field of the data packet are found; (d) selecting the lowest cost match of the minimum cost matches; and (e) routing the data packet to the output data link corresponding to the lowest cost match. In accordance with an important variation of this embodiment, in which the repeating step comprises backtracking up the first trie, and at least one of the second tries (T2A) associated with a record (R1) in the first trie comprises at least one record containing a switch pointer pointing to a second trie (T2B) having a top record associated with ancestor record (R2) in the first trie, there is provided a method wherein the step of backtracking up the first trie comprises following the switch pointer from trie T2A to trie T2B.

There is also provided a method for routing a data packet through an electronic routing device having an input data link and a plurality of output data links, the data packets having at least a first field and a second field, the method comprising: mapping a filter database B comprising N filters, into a rectangular hash table T, where each entry T[i,j] contains all filters F matching i symbols of the first field and j symbols of the second field of a data packet, and includes records containing associated costs for the filters F; for each pair of values i and j in hash table T: extracting i symbols from the first field of the data packet and j symbols from the second field of the data packet, finding a matching entry in hash table T corresponding to a filter matching the i symbols of the first field and the j symbols of the second field of the data packet, and determining the cost associated with each matching filter; selecting the matching filter having the least cost; and routing the data packet to the data link corresponding to the selected matching filter having the least cost.

There is still further provided a method for routing a data packet through an electronic routing device having an input data link and a plurality of output data links, the data packets having at least a first field and a second field, the data packets being routed in accordance with preselected routing filters each having an associated cost and output data link, the method comprising: selecting a lower left corner tuple of a rectangle of tuples having r rows and c columns, the selected tuple becoming a current tuple; searching for a filter keyed by bits of fields of the data packet corresponding to the current tuple; until a first row or last column is reached, selecting a next tuple of the rectangle of tuples in an adjacent row above and in a same column as the current tuple when the searching step is unsuccessful, and selecting a next tuple of the rectangle of tuples in the same row as, and in an adjacent column to the right of the current tuple, when the searching step is successful, wherein the current tuple ceases to be the current tuple and the selected tuple thereby becomes the current tuple; selecting a filter of those found in the searching step having a lowest associated cost; and routing the data packet to the output data link corresponding to the filter selected in the filter selecting step.

Also provided is a method for routing a data packet through an electronic routing device having an input data link and a plurality of output data links, the data packets having at least a first field and a second field, the data packets being routed in accordance with preselected routing filters each having an associated cost and output data link, the method comprising: selecting a lower left corner tuple of a rectangle of tuples having r rows and c columns, the selected tuple becoming a current tuple; searching for a filter keyed by bits of fields of the data packet corresponding to the current tuple; until a first row or last column is reached, selecting a next tuple of the rectangle of tuples in a row above and in a same column as the current tuple when the searching step is unsuccessful, and selecting a next tuple of the rectangle of tuples in the same row as, and in a column to the right of the current tuple in accordance with a rope value associated with the current tuple when the searching step is successful, wherein the current tuple ceases to be the current tuple and the selected tuple thereby becomes the current tuple; selecting a filter of those found in the searching step having a lowest associated cost; and routing the data packet to the output data link corresponding to the filter selected in the filter selecting step.

Also provided is another method of routing a data packet using a set of filters that are based upon bit fields within the data packet, the bit fields including a destination field and a source field, each filter also specifying, or having been replicated so as to specify, a specific value of protocol field, and each filter also specifying an output port and having an associated cost, the method comprising: dividing the set of filters into four groups, a first group of filters consisting of filters specifying neither a source field value nor a destination field value; a second group of filters consisting of filters specifying a destination field value but no source field value, a third group of filters consisting of filters specifying a source field value but no destination field value, and a fourth group of filters specifying both a source field value and a destination value; for each group of filters, constructing a corresponding hash table storing, as records, all source field value and destination field value combinations in the group, including concatenated protocol field specifications; for each record in the hash tables, storing a pointer to a grid of tries data structure including a plurality of tries storing all filters matching the record; for each data packet received, searching each of the hash tables for a match to a record keyed to the bit fields within the data packet; for each matching hash table record, searching the trie pointed to for a matching entry for the destination field value and source field value of the data packet; routing the packet to the data port specified by the filter corresponding to a matching entry found in the searches of the grid of tries having a lowest cost.

Another method of routing a data packet using a set of filters that are based upon bit fields within the data packet, the bit fields including a destination field and a source field, each filter also specifying, or having been replicated so as to specify, a specific value of protocol field, and each filter also specifying an output port and having an associated cost, comprises the steps of: dividing the set of filters into four groups, a first group of filters consisting of filters specifying neither a source field value nor a destination field value; a second group of filters consisting of filters specifying a destination field value but no source field value, a third group of filters consisting of filters specifying a source field value but no destination field value, and a fourth group of filters specifying both a source field value and a destination field value; constructing rectangular databases of tuples, one for each of the four groups of filters, the rows and columns of the rectangles corresponding to a number of bits of the destination field, source port field, protocol field, and port numbers that form a hash key for searching a tuple at a specified row and column; associating each filter to a unique one of the tuples; associating a precomputed stored cost and stored filter for each filter in each tuple; and for each received data packet, and for each rectangular database of tuples starting at a last row and first column of each rectangular database of tuples, performing a rectangular search for a lowest cost matching filter; selecting, of the lowest cost matching filters found corresponding to each rectangular data base of tuples, the one of these matching filters having the lowest cost; and routing the database in accordance to the matching filter selected in the step of selecting the one of the matching filters having the lowest cost.

Also provided is device for routing a data packet having at least a first and a second field, the device comprising: an input data link at which the input data packet arrives; a plurality of output data links; memory containing a first trie of records and a set of second tries of records associated with records of the first trie; means coupled to the input data link for receiving the data packet and for searching the first trie of records in memory for a record having a longest prefix match of the first field of the data packet; means, responsive to the means for receiving and for searching the first trie of records, for searching a second trie of records in memory associated with the matched record in the first trie of records for a lowest cost match of the second field of the data packet; and means, responsive to the means for searching a second trie of records, for routing the data packet to the output data link corresponding to the lowest cost match.

Further refinements of these inventive methods and devices, as well as other method and device embodiments, will become apparent upon reading the detailed description and referring to the accompanying figures.

It is thus an object of the invention to provide fast, scalable devices and methods for level 4 routing.

It is a further object of the invention to provide routing methods and devices suitable for use with various protocols, including Internet Protocol.

It is yet another object of the invention to provide methods of routing data packets over an electronic data network that avoid the need for excessive amounts of memory.

It is still another object of the invention to provide methods of routing data packets over an electronic data network that provide a discriminating form of router forwarding.

Details of how these and other objectives of the invention are achieved will be made apparent to one skilled in the art by reference to the detailed description of the invention and to the accompanying figures. It will, of course, be understood that may not be necessary to achieve all of the objectives in every embodiment of the invention that otherwise falls within the spirit and scope of the invention.

BRIEF DESCRIPTION OF THE DRAWINGS

FIGS. 1A and 1B are representations of routing filters, in which FIG. 1B is a table showing a database at a router illustrated in the block diagram of FIG. 1A;

FIG. 2 is a block diagram of a hypothetical fragment of the Internet linking users in France with users in the United States;

FIG. 3 is a simplified block diagram of a router showing its forwarding database;

FIG. 14 is a sample database of 11 filters in which each filter is a combination of destination and source prefixes;

FIG. 15 shows a representation of a 3×3 space of tuples corresponding to the filter database of FIG. 14;

FIG. 16 is a block diagram of marker placement and precomputation in accordance with one aspect of the invention;

FIG. 17 is a structured pseudocode listing for a rectangular tuple search in accordance with the invention;

FIG. 18 is a representation of the reasoning behind a proof of correctness for the rectangle search method of the invention;

FIG. 19 is an example of filter tables that illustrate how memory blowup can be avoided in accordance with an embodiment of the invention;

FIG. 20 is a representation of the four hash tables built for each combination of port fields in accordance with an embodiment of the invention;

FIG. 21 is a representation of an organization of all-or-nothing tuple space in accordance with one embodiment of the invention;

FIG. 22 is a representation of a tuple rectangle showing tuples in a main diagonal and a lower diagonal;

FIG. 23 is a comparison of the performance of the best search strategies with lower bounds for practical cases of interest;

FIG. 24 is a listing of structured pseudocode for an improved rectangular search with rope, in accordance with another embodiment of the invention;

FIG. 25 is a simplified block diagram of an example of a communications network;

FIG. 26 shows the format of a message sent by a source to a destination in the network of FIG. 25;

DETAILED DESCRIPTION OF THE INVENTION

Figures 8, 9, 10:
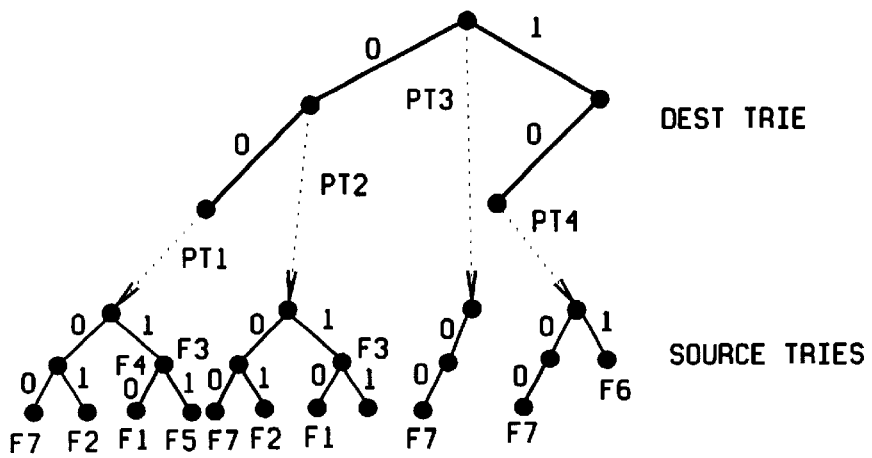
FIG. 8 is a representation of a grid of tries in accordance with the invention that may require O(N) memory for N filters in the worst case.
FIG. 9 is a sample database of seven dest-source filters.
FIG. 10 is a sample database forcing $N^2$ memory for two-dimensional set pruning trees.

A first embodiment of the invention is a method based on tries. In its simplest form, a trie is a binary branching tree, with each branch labeled 0 or 1. The prefix associated with a node u is the concatenation of all the bits from the root to the node u. FIG. 8 is a representation of this first embodiment, in which Dest-Trie is a trie for the destination prefixes. The nodes corresponding to a valid destination prefix in the database are shown as solid dots while others are shown as circles. Each valid destination prefix has a pointer (PT1, PT2, PT3, PT4) to a trie containing the source prefixes that belong to filters having the corresponding destination prefix. In FIG. 8, for instance, the leftmost node in the Dest-Trie has prefix value 00; the node on the right has value 10. Our basic data structure, called a grid-of-tries, is designed to handle two-dimensional filters, such as destination-source pairs. The associated method is significant in its own right because large backbone routers may have a large number of destination-source filters to handle virtual private networks and multicast forwarding. The grid-of-tries can be extended, albeit with some loss of efficiency, to handle filters on other fields such as port numbers. We start by explaining the basic two-dimensional data structure using an example database of 7 destination-source filters, shown in FIG. 9. Though our examples use destination-source tries, we note that the idea can be abstracted to handle filters with any two prefix fields (and the remaining fields completely wildcarded).

To motivate the grid-of-tries method embodiment, we begin by describing two-dimensional set pruning trees. A trie is built on the destination prefixes in the database. FIG. 8 illustrates the construction for the example database in FIG. 9. Each valid prefix in the Destination Trie (Dest-Trie) points to a trie containing some source prefixes. The question that arises is, which source prefixes should be stored?

For instance, consider D=00. Both filters $F_4$ and $F_5$ have this destination prefix, and so the corresponding source prefixes 1* and 11* are stored at D. But storing only these filters is not sufficient, since filters $F_1$, $F_2$, $F_3$ also match whatever destination D matches. In fact, the wildcard destination prefix * of $F_7$ also matches whatever D matches. Suppose a packet arrives with a destination header starting with 00 and a source address starting with 101. Then, the least cost filter matching this header is the lowest cost filter among $\{F_1, F_3, F_4\}$. This suggests the need to store at D=00 a source trie containing the source prefixes for $\{F_1, F_2, F_3, F_4, F_5, F_7\}$, because these are the filters whose destination is a prefix of D. FIG. 8 shows the complete data structure for the database in FIG. 9.

In this trie of tries, this method embodiment matches the destination of the header in Dest-Trie. This yields the longest match on the destination prefix. Then, the associated source trie is traversed to find the longest source match. As the source trie is searched by the router, the router keeps track of the lowest cost matching filter. Since all filters that have a matching destination prefix are stored in the source trie being searched, the router finds the correct least cost filter. This is the basic idea behind set pruning trees. See D. Decasper et al., "Router Plugins: A Software Architecture for Next Generation Routers," *Proc. ACM SIGCOMM* 98, September 1998.

Unfortunately, this simple extension of tries from one to two dimensions has a memory blowup problem. The problem arises because a source prefix can occur in multiple tries. In FIG. 8, for instance, the source prefixes $S_1, S_2, S_3$ appear in tries associated with D=00* as well as D=0*. A worst-case example forcing $\Theta(N^2)$ memory is created using the set of filters shown in FIG. 10. The problem is that since destination prefix * matches any destination header, each of the N/2 source prefixes are copied N/2 times, one for each destination prefix. Similar examples that apply to a number of other simple methods can be used to show $N^k$ storage for K-dimensional filters.

In order to avoid the memory blowup of the simple trie scheme, observe that filters associated with a destination prefix D are copied into the source trie of D' whenever D is a prefix of D'. For instance, in FIG. 8, the prefix D=00 has two filters associated with it: $F_4$ and $F_5$. The others, $F_1, F_2$, and $F_3$ are copied because their destination field 0 is a prefix of D; similarly, $F_7$ is copied because its destination field * is also a prefix of 00.

Figure 11:
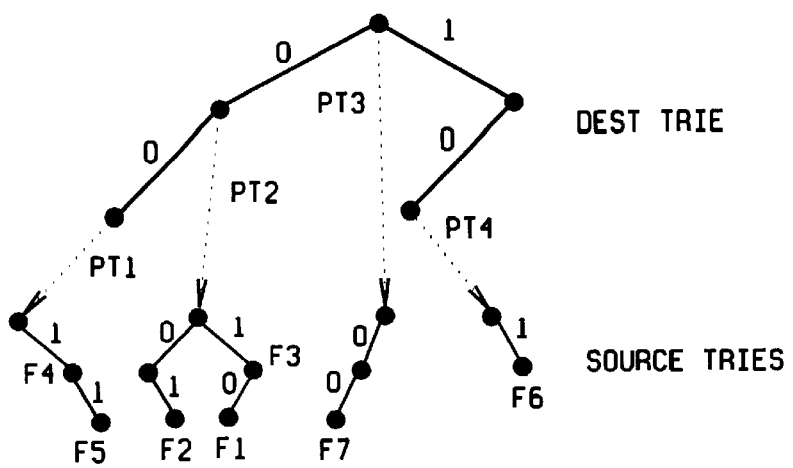
FIG. 11 is a representation of an improved method in accordance with one aspect of the invention in which memory blowup is avoided by storing each filter in exactly one trie.

Copying can be avoided by having each destination prefix D point to a source trie that stores the filters whose destination field is exactly D. This also requires a modification of the search strategy as follows: instead of just searching the source trie for the best matching destination prefix D, the source tries associated with all the ancestors of D must be searched. This method is illustrated in FIG. 11, which shows schematically the storing of each filter in exactly one trie.

In order to search for the least cost filter, the router, in this modified embodiment, traverses the Dest-Trie and finds the longest destination prefix D' matching the header. The router searches the source trie of D', and updates the least cost matching filter. The router then works its way back up the Dest-Trie, and searches the source trie associated with every prefix of D' that points to a nonempty source trie. (In this method, each of the source tries corresponding to prefixes of the destination could be searched in any order without changing the search time; we described this particular order as a matter of descriptive convenience.)

Since each filter now is stored exactly once, the memory requirement for the new structure is O(NW), which is a significantly improvement over the previous embodiment. Unfortunately, the lookup cost in the modified embodiment is worse than the first embodiment: in the worst-case, the lookup costs $\Theta(W^2)$, where W is the maximum number of bits specified in the destination or source fields. The $\Theta(W^2)$ bound on the search cost follows from the observation that, in the worst-case, the router may end up searching W source tries, each at the cost of O(W), for a total of $O(W^2)$.

Figure 12:
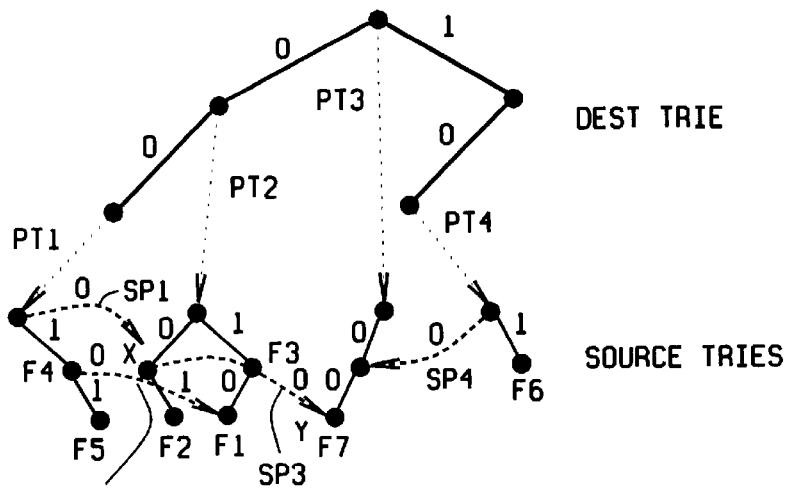
FIG. 12 is a representation of a further improvement of a search method in accordance with the invention in which switch pointers are used.

We now describe key inventive modifications for improving the search cost in two-dimensional tries from $O(W^2)$ to O(W), while keeping the memory requirement linear. These modifications are to use precomputation and switch pointers to speed up search in a later source trie based on the search in an earlier source trie. FIG. 12 shows a representation of the construction with switch pointers. The switch pointers SP1, SP2, SP3 and SP4 are shown using dashed lines between source tries to distinguish the switch pointers from the dotted lines PT1, PT2, PT3 and PT4 that connect the Dest-Trie nodes to the corresponding source tries.

In order to understand the role of switch pointers such as SP1, SP2, SP3 and SP4, consider matching a packet with destination address 001 and source address 001. The search in the Dest-Trie gives D=00 as the best match. So the search for the matching source prefix is started in the associated source trie, which contains filters $F_4$ and $F_5$. However, the search immediately fails, since the first bit of the source is 0. According to the previous embodiment, we would back up along the Dest-Trie and restart the search in the source trie of D=0*, the parent of 00*.

In this method embodiment, however, the switch pointer is used to directly jump to the node x in source trie containing $\{F_1, F_2, F_3\}$. Similarly, when the search on the next bit of the source fails again, we jump to the node y of the third source trie (associated with the destination prefix *). Intuitively, the switch pointers allow a jump directly to the lowest point in the ancestor source trie that has at least as good a source match as the current node. This allows the method to skip over all filters in the next ancestor source trie whose source fields are shorter than the current source match. This in turn improves the search complexity from $O(W^2)$ to O(W).

We now define the switch pointers more precisely. We say that destination string D' is an ancestor of D if D' is a prefix of D. We say that D' is the lowest ancestor of D if D' is the longest prefix of D in the Destination Trie. Let T(D) denote the source trie pointed to by D. (Recall that T(D) contains the source fields of exactly those filters whose destination field is D.) Let u be a node in T(D) that fails on bit 0; that is, if u corresponds to the source prefix s, then the trie T(D) has no string starting with s0. Let D" be the lowest ancestor of D whose source trie contains a source string starting with prefix s0, say, at node v. Then, the router places a switch pointer at node u pointing to node v. If no such node v exists, the switch pointer is nil. The switch pointer for failure on bit 1 is defined similarly. For instance, in FIG. 12, the node labeled x fails on bit 0, and it has a switch pointer to the node labeled y.

A switch pointer fills in a void at a trie node when no further match is possible within the current trie. For this reason, we also use the term failure position to refer to the branch where the switch pointer is put. For instance, if a switch pointer with bit 0 is placed at a node u, then we say that u0 is a failure position. Similarly, if u also has a switch pointer for bit 1, then we say that u1 is a failure position.

The switch pointers permit an increase in the length of the matching source prefix without having to restart at the root of the next ancestor source trie. In particular, they allow us to skip over all filters in the next source trie whose source fields are shorter than the current source match.

For instance, consider the packet header (00*, 10*). A router starts with the first source trie, pointed to by the destination trie node 00*. The router matches the first source bit 1, which gives filter $F_4$. But then the router fails to match on the second bit and therefore follows the switch pointer, which leads to the node in the second trie labeled with the filter $F_1$. The switch pointers at the node containing $F_1$ are both nil, and the search terminates. Note, however, that the router would have missed the filter $F_3$=(0*, 1*), which also matches the packet. While in this case $F_3$ has higher cost than $F_1$, in general the overlooked filter could have lower cost.

We solve this problem by having each node in a source trie maintain a variable storedFilter. Specifically, a node v with destination prefix D and source prefix S stores in storedFilter(v) the least cost filter whose destination field is a prefix of D and whose source field is a prefix of S. With this precomputation, the node labeled with $F_1$ in FIG. 12 would store information about $F_3$ if $F_3$ had lower cost than $F_1$.

Note that the search cost in this method is at most 2W. The time to find the best destination prefix is at most W. After that all the time is spent traversing the source tries. However, in each step, the length of the match on the source field increases by one—either by traversing further down in the same trie, or following a switch pointer to an ancestral trie. Since the maximum length of the source prefixes is W, the total time spent in searching the source tries is also W. The memory requirement is O(NW), since each of N filters is stored only once, and each filter requires O(W) space.

Several improvements to this method embodiment are possible. First, notice that the only role played by the Dest-Trie is in determining the longest matching destination prefix. The longest matching destination prefix tells the router in which source trie to start searching. From that point on, the Dest-Trie plays no role, and the router moves among source tries using switch pointers. Thus, the first improvement is to replace the Dest-Trie with a fast scheme for determining the best matching prefix (DegerMark et al., "Small Forwarding Tables for Fast Router Lookups," *Computer Communications Review*, October 1997; M. Waldvogel et al., "Scalable High Speed IP Routing Lookups," *Proc. SIGCOMM 97*, October 1997) of the destination address. The scheme proposed in Waldvogel requires O(log W) time in the worst-case for finding the longest matching prefix. Combining this scheme with the grid-of-tries leads to a total lookup time of (log W+W) for destination-source filters.

Second, instead of using 1-bit source tries, the router can use multi-bit tries (V. Srinivasan et al., "Faster IP Lookups using Controlled Prefix Expansion," *Proc. ACM Sigmetrics 98*, June 1998). In multi-bit tries, the router first expands each destination or source prefix to the next multiple of k. For instance, suppose we use k=2. Then, in the example of FIG. 12, the destination prefix 0* of filters $F_1$, $F_2$, $F_3$ is expanded to 00 and 01. The source prefixes of $F_3$, $F_4$, and $F_6$ are expanded to 10 and 11. If we use k-bit expansion, a single prefix might expand to $2^k$−1 prefixes. The total memory requirement grows from 2NW to NW $2^k$/k, and so the memory blows up by the factor $2^k$−1/k. On the other hand, the depth of the trie reduces to W/k, and so the total lookup time becomes O(log W+W/k). Depending on the memory available, one can optimize the time-space tradeoff as in V. Srinivasan et al.

We now describe how to handle more general filters (with the protocol type and port number fields specified) using the grid-of-tries. We will assume that the port number field in each filter is either a single port number or a wild card. (Grid-of tries can be extended to handle port number ranges by creating further two-dimensional "planes," but with a loss of efficiency.)

In accordance with this next method embodiment, the filters are partitioned into a small number of classes, each of which only requires a lookup using the destination-source combination. First, the Protocol field is eliminated at the cost of increasing the memory by a factor of 3, as follows. There are two main protocols, TCP and UDP; all other protocols are grouped under the class "Other" for the purpose of packet forwarding. Note that port numbers are only defined for TCP and UDP, and not for the other protocols. Thus, any filter with a * in the protocol field is replicated three times using 3 values of the protocol, TCP, UDP, and Other. There are only two remaining port fields. Four hash tables HT1, HT2, HT3 and HT4 are built, one for each possible combination of port fields—both unspecified, destination only, source only, and both specified. (Of course, it is not necessary to the invention to use both port fields. Either one could be used by itself, in which case only two hash tables would be built. Also, additional fields might be present in some protocols, so that more than four hash tables might be built, if more than two remaining fields are used in this embodiment.) In the present embodiment, with the present combination of fields, the hash tables are indexed by the combination of port fields and the protocol field (TCP, UDP, or Other). See FIG. 13.

Figure 13:
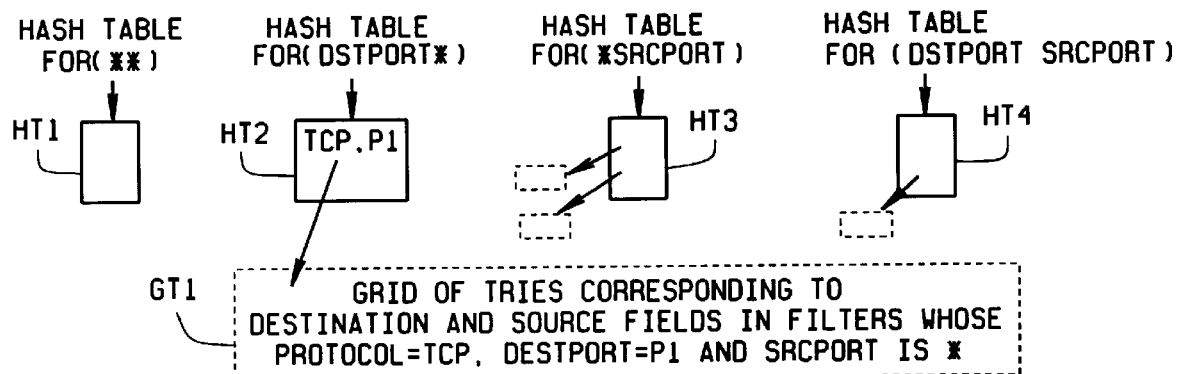
FIG. 13 is a block diagram representation of another embodiment of the inventive method in which the grid-of-tries method is extended to deal with port number fields.

Given a filter of the form (D, S, TCP, P1, *), in accordance with this method embodiment, the router first places an entry, if it does not already exist, in the (DstPort, *) hash table with a key of (TCP, P1). This points to a grid-of-tries structure GT1 representing the destination and source prefixes of all the filters that have Prot=TCP, DstPort=P1 and SrcPort=*, as shown in FIG. 13. Each filter is placed in exactly one grid-of-tries structure, which keeps the memory linear in the number of filters.

Finally, to search for a header, the router searches each of the four hash tables in turn. When searching a hash table, the router uses the actual port numbers and the protocol field to follow a pointer to a grid-of-tries, where it performs the search we described. For each of the four grid-of-tries searched, the router keeps track of the lowest matching filter. A simple optimization is to combine the hash of the port number fields with the lookup in the first trie node of the grid-of-tries (see FIG. 13). This saves 4 hashes.

Yet another method embodiment is based on hashing, where the search takes place in a bit length tuple space. Essentially, the filter database is partitioned into classes, where filters in each class have exactly the same number of bits specified in each field. We use the term tuple space to denote the space of various classes possible in this mapping. Each tuple represents a possible combination of bit lengths for the various filter fields.

Recall that each filter F has K fields, each specified as a bit string; in our examples, we often use K=5 fields. We use bits(F[j]) to denote the number of bits specified in the field F[j]. So, for instance, if F[1]=1011*, then bits(F[1])=4. We say that filter F belongs to tuple T=(bits$_1$, bits$_2$, . . . , bits$_K$) if bits(F[j])=bits$_j$, for j=1, 2, . . . , K. That is, each tuple is a K-dimensional vector of bit lengths, and a filter F belongs to tuple T if the jth field of F has exactly 7[j] bits specified. Clearly, each filter in the database belongs to one and only one tuple.

EXAMPLE

Consider filters $F_1$=(110*, 11*, *, *, *), $F_2$=(100*, 01*, *, *, *), and $F_3$=(101*, 101*, TCP, 1011, *). Filters $F_1$ and $F_2$ both belong to the tuple (3, 2, 0, 0, 0), while $F_3$ belongs to the tuple (3, 3, 8, 4, 0).

Suppose we have a filter database B consisting of N filters. In accordance with this method embodiment, the router determines, for each filter F in B, the tuple corresponding to F. That is, the router maps filters from the field space to the tuple space. Not every tuple necessarily receives a filter. In the case of the preceding example, which has only 3 filters, all but 2 tuples are empty. Let tuples(B) denote the set of distinct tuples that have at least one filter of B assigned to them. Let dim(B) denote the number of elements (non-empty tuples) in tuples(B). Since many filters can map to the same tuple, the size of the tuple space can be much smaller than the number of filters—that is, dim(B) can be much smaller than N.

Indeed, dim(B) depends only on the number of header fields and their bit lengths. For example, if the filters in a database only specified destination fields, then dim(B)≦32, since destination address in IPv4 is a 32 bit string. As another example, if a database only had all-or-nothing filters on 5 fields (where each field is either fully specified or completely unspecified), then again dim(B)≦32, since each field has two combinatorial possibilities (specified or not specified), the total number of distinct combinations is 2×2×2×2×2=32. Thus, mapping the filter database to the tuple space alone can significantly reduce the number of search steps. (Of course, we haven't yet described how to search within each tuple space, but that problem is relatively simple and well-understood—when all filters have exactly the same format, a lookup can be accomplished in a single hash computation.) We will now describe a series of progressively more sophisticated and refined search strategies that dramatically improve the search cost both in the worst-case as well as the average case.

We call the main innovation provided in this method embodiment (the tuple space search) "Rectangle Search," which is a rapid method for searching a two-dimensional tuple space. We first explain the method in its simplest form: using two-dimensional (destination-source) filters.

Consider a filter database B consisting of N filters, each specifying a destination-source pair. We will use the example database in FIG. 14 to explain this embodiment of the inventive method. First, these filters are mapped to tuple space T, where Y[ij] contains all those filters F that satisfy bits(F[1])=i and bits(F[2])=j; we assume here for purposes of our explanation, and by way of example only, that the first field in each filter is the destination and the second field is the source address. (In FIG. 14, the destination and source fields are specified using at most 2 bits, and FIG. 15 shows the mapping of these filters to the 3×3 tuple spaces.) Since IP destination and source fields are 32 bit strings, the tuple space required in memory is a 33×33 square matrix (the prefix lengths can vary from 0 to 32). The filters of each tuple are organized into a hash table. In order to see if any filter in T[i,j] matches a packet header H=(D, S), the router extracts the first i bits of D, concatenates it with the first j bits of S, and uses the resulting key to hash into the hash table of T[ij]. The router searches the entire tuple space, updating the least cost filter on each match. Since every filter $F_i=(D_i, S_i)$ matching H must satisfy the property that $D_i$ is a prefix of D and $S_i$ is a prefix of S, these steps will result in the router discovering a match between H and $F_i$ and updating the cost.

If destination or source fields are W bits long, then the tuple space is a (W+1)×(W+1) square. The naive search method described above takes $(W+1)^2$ hash steps. Our innovation improves this search time to 2W+1 hash steps in the worst case. We shall provide a lower bound argument to show that no search strategy can reduce the number of hash steps any further.

There are two key ideas in improving the search time: precomputation and markers. The former is designed to eliminate a whole column of the tuple space when a match occurs; the latter is designed to eliminate the rest of a row when no match is found. Suppose the router finds a match for a header H=(D, S) with a filter F in the tuple T[ij]. Note that every tuple T'=[i',j'] in the upper-left quadrant of T[i,j] has i'≦i and j'≦j. That is, the filters in the tuple T' are less specific than those in T. The important point here is that filters in the northwest quadrant of F are less specific than F, and any tuple space with this property will allow precomputation. Therefore, the router can precompute the least cost filter matching F from all these tuples, and avoid having to search them. For instance, in FIG. 15, filter $F_4$ can store the best filter matching the destination-source pair (00, 1) in the set $\{F_3, F_8, F_9, F_{10}, F_{11}\}$.

Precomputation is useful when the router finds a match in a tuple. But what if the router does not find a match? It cannot ignore the rest of the tuples in the row i, because it is possible that a tuple T[i,k], with k>j, matches H. For this reason, every filter F should leave a marker at all the tuples to its left. Specifically, if there is a filter F=(D, S) in tuple T[i,j], then the router creates a marker filter F'=(D, S') at every tuple T[i,j'] where j'<j and S' is the j'-bit prefix of S.

For instance, filter $F_5$ will leave a marker (00, *) in T[2,0], and a marker (00, 1*) in T[2,1]. Thus, if the router fails to find a match in T[2,0], say, for header (0101, 0011), then the rest of the row can be safely disregarded.

Given a header H=(D, S), Rectangle Search starts the search at the bottom-left tuple, T[W, 0]. If there is a match, the checking moves one cell to the right (same row, next column). If there is no match, the checking moves one cell up (same column, previous row). The search terminates whenever there is no next cell to check (either because the router found a match in the last column, or the router failed to find a match in the first row). It is easy to see that the total number of tuples searched is at most 2W+1. In FIG. 15, arrows AR1, AR2, AR3 and AR4 illustrate the path followed by a rectangle search for the header (101, 010) on the example database of FIG. 14.

In FIG. 15, arrows AR1, AR2, AR3 and AR4 show the search path followed by a Rectangle Search on a header (101,010). The search produces a match at T[2,0], since F6 leaves a marker, with D=10. Precomputation for this marker stores the results of F9 and F11. Following the arrows starting AR1, there is no match in T[2,1], because no filter in {F4, F5, F6} has a destination prefix 10 and a source prefix 0. Matching again fils in T[1,1], resulting in a move to T[0,1]. There is a match in T[0,1], resulting in a move to T[0,1]. There is a match in T[0,1] because F7 leaves marker (*,0*) in T[0,1]. The final hash is in the triple T[0,2], wherein the match fails.

The discussion of the Rectangle Search embodiment assumed destination-source pairs as the underlying filter space. Moreover, the tuple T[i,j] represented the filters whose destination field was specified to i bits and source field to j bits. Rectangle Search, however, is a more general scheme, and applies to any two-dimensional tuple space that satisfies the following rectangle property: filters in tuple T[i,j] are more specific than those in T[i',j'] whenever i'≦i and j'≦j.

There is no a priori restriction on each field of the tuple either—they can even be combinations of other fields, a feature that we will use later for increased efficiency in search time. The tuple space also need not be square. In the following, let us revisit the Rectangle Search and describe it in somewhat more general terms, which will be useful for incorporating additional header fields.

Consider a two-dimensional matrix T, with R rows and C columns. Each cell in this matrix is associated with a tuple, and we use the notation T[r,c] for the tuple that lies in the rth row and cth column of the matrix. Given two tuples T, T', we say that T'<T if T'[i]≦T[i], for i=1,2, ..., K, and T'[i]<T[i], for some i, where recall that K is the number of fields, and T[i] is the number of bits specified in the ith field of the filter. (In our current discussion, we are using K=2 fields, namely, destination and source.) If T'<T, we say that tuple T is more specific than tuple T'. For instance, tuple (32, 32) is more specific than both (32, 0) and (0, 32), but tuples (32, 0) and (0, 32) are incomparable. We say that a matrix cell (r',c') is northwest of (r,c) if r'≦r, C'≦c and either r'<r or c'<c.

We say that the tuple space T is a rectangle if T[r', c']<T[r,c], whenever (r', c') is northwest of (r,c). In other words, in a rectangle, a tuple is more specific than any tuple lying in its northwest quadrant. Finally, we say that a filter F' is prefix compatible with another filter F if bits(F'[i])≦bits (F[i]), for i=1,2, ..., K. Observe that if F' is prefix compatible with F and T, T' are tuples containing F, F', respectively, then T'<T.

We use precomputation and marker placement in the tuple space to allow rectangle search. Specifically, suppose F=(D, S) is a filter in the tuple T[r,c]. Then, F stores the least cost filter that is prefix compatible with it. In other words, storedCost(F)=min {cost(F'): F' is prefix compatible with F}. We also store in storedFilter(F) the filter F' that achieves storedCost(F). (In this search method, it would be sufficient if storedCost(F) keeps only the best filter compatible with F lying above F in its column.) This is the precomputational step. Each filter F, contained in the tuple T[r,c], places a marker in tuple T[r,c'], where c'<c. Notice that each filter can contribute at most C markers, which is the number of columns. Thus, markers ensure that if a possible match with a header exists in tuple T(r,c), then it can be detected at any tuple T(r, c'), for c'<c. FIG. 16 shows a schematic of the marker placement and precomputation in a rectangle RECT1.

Figures 4, 5, 6, 7:
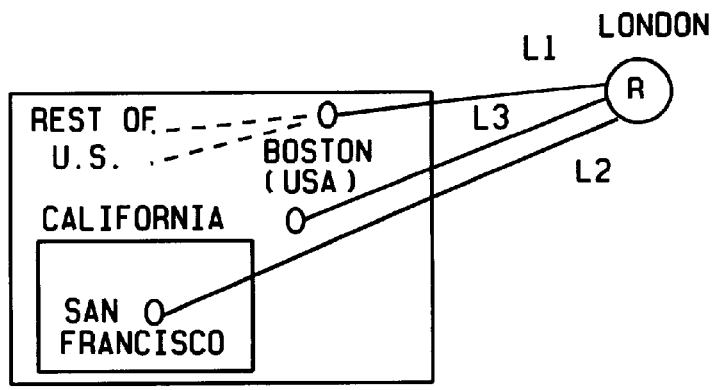
FIG. 4 is a more geographical representation of the fragment of the Internet shown in FIG. 2.
FIG. 5 is a representation of a router database corresponding to the routing of FIG. 4, in which the router stores address prefixes to succinctly store a number of equivalent destinations.
FIG. 6 is a sample forwarding table of IP address prefixes.
FIG. 7 is a figure illustrating important fields of an Internet message.

With these preliminaries in place, we now present structured pseudocode suitable for translation into any of a variety of computer languages for Rectangle Search in FIG. 7. In this code, T is a R×C rectangle, with rows numbered 1 through R, and columns numbered 1 through C.

The reasoning behind a proof of correctness is shown in FIG. 18. The search starts at the lower left hand corner of the rectangle SH1, and proceeds in a zigzag fashion towards the upper row or last column, whichever comes first. The basic invariant maintained by the algorithm is the following: when the algorithm is considering a cell (r, c), the temporary variable F already holds the lowest cost filter among all cells (r', c') such that r'>r or c'<c. This is shown on the left of FIG. 18, where the shaded region SH1 portion of the rectangle that has been eliminated.

Consider what happens if the procedures produces a match at position (r, c). Since any filter at position (r, c) summarizes all information above it in its column, the search can eliminate column c as shown by shaded region SH2 and move to position (r, c+1), namely, the adjacent cell on the right. If, however, the procedure does not find a match, there cannot be other matching filters in this row, because any such filter would have placed a marker at (r, c). Therefore, in the case of no match, the router can eliminate row r as shown by shaded region SH3 and move one cell up to row r−1. In both cases, the invariant is preserved. It is easy to see that when either r<0 or c≧C, the entire rectangle is eliminated and F holds the lowest cost filter.

The proof shows that rectangle search of a tuple space T of dimension R×C requires at most (R+C−1) hashes and the data structure needs O(N×min (R, C)) memory space, where N is the number of filters in the database. The upper bound on the memory space follows because each filter can contribute a number of markers equal to the number of columns; the rectangle can always be rotated so that the smaller dimension is the number of columns.

In general, the destination and source addresses can have any prefix length between 0 and 32, which makes the size of the tuple space rather large: 33×33=1089. In practice, however, most of the prefixes come in lengths 16, 24, or 32; other prefix lengths occur with small frequency. The amount of memory required for the tuple space can be significantly reduced by requiring all prefixes to have a small set of lengths (such as 16, 24, or 32), and by expanding arbitrary length prefixes to match one of these lengths. For instance, suppose the prefix lengths 16, 24, and 32 are selected. If P is a prefix of length 14, then P will expand into 4 prefixes, P00, P01, P10, P11, each of which has length 16. In the discussion below, we use a general parameter k to denote the granularity of the expansion. The parameter k denotes the maximum length difference between any two consecutive prefix lengths in the expansion. So, if lengths 8, 16, 24 and 32 are selected, then k=8. In general, the chosen lengths do not need to be equally spaced. (The choice of lengths is a degree of freedom that can be exploited to optimally reduce the memory required for a given search cost.)

Unfortunately, a naive method of prefix expansion in the two-dimensional destination-source tuple space can have large memory blowup. Suppose there is a destination-source filter (D*, S*). Expanding D and S individually leads to $b=2^k$ destination and source prefixes in the worst-case. However, in order to build a hash table for these expanded prefixes will require $b^2=2^k \times 2^k$ entries—one for each pair of expanded D-S pairs. In the following, we describe a method that avoids this multiplicative blowup of the memory.

The first technique is to separate the destination and source fields in the hash. The router builds a separate hash table containing all the (expanded) destination prefixes; each entry in this hash table points to filters that have that destination field. Suppose there is a filter F=(D, S). The router expands the destination D into at most b prefixes, and each of these prefixes will point to a hash table containing the expanded prefixes of S. This is done for each filter in the database. This avoids the problem of having to introduce $b^2$ hash entries, one for each pair of expanded prefixes. This simple method does not work, however, as shown below.

Consider an example of two filters, $F_1=(1*, 001*)$ and $F_2=(110*, 0*)$. Suppose we set k=3, meaning that each prefix is expanded to length 3. Then, $D_1$ is expanded into 4 entries: 100, 101, 110, 111, while $S_1$ remains unchanged. Each of the $D_1$ entries in the D hash table points to $S_1$. Similarly, $D_2$ in unchanged, but $S_2$ expands to 4 entries: 000, 001, 010, 011. The $D_2=110$ entry should also point to the hash table containing the four $S_2$ prefixes, but it already points to $S_1$. Having a D prefix point to multiple S hash tables will adversely affect the search time.

Our solution is to have each D prefix point to a single S hash table, but ensure that S entries in that table reflect the best matching cost of all filters whose destination field has D as a prefix. In the preceding example, the destination prefix 110 will point to the table containing $S_2$ prefixes, while the other 3 destination prefixes will point to 001 source prefix.

In general, this embodiment of the inventive method the following construction rule: Let $P_D$ be an expanded destination prefix. Let F'=(D', S') be the filter whose destination D' has the longest prefix match with $P_D$. The entry $P_D$ will point to the hash table containing the expanded prefixes of S'. In this hash table, each expanded prefix $P_S$ will store the least cost filter that is prefix compatible with $(P_D, P_S)$. In the example of FIG. 19, for instance, the source entry 001 in the 0* expansion stores the better of the two filters $F_1$ and $F_2$.

The complete data structure for the destination-source filters can be described as follows. The destination prefixes in the database are grouped and expanded to the lengths 16, 24, and 32. The destination prefixes within each group are organized into a hash table (or any other best matching prefix structure). Each prefix in the hash table has pointers to 3 source hash tables, one for each length group. While this view presents the structure as a tree of hash tables, we can still regard the data structure as a rectangle for the purpose of conforming to our earlier discussion.

It is easy to see that, in this scheme, each destination and source prefix is expanded only once, and thus the memory blows up by the factor b, and not $b^2$.

With controlled expansion, we can reduce the D-S tuple space from (W+1)×(W+1) to 3×3. Using Rectangle Search, the router can find the least cost filter in this reduced tuple space in 3+3−1=5 hashes. Unless there are many prefixes of lengths between 1 and 8, the memory blowup should be about $2^8$=256. If there are many small length prefixes, it is possible to do the expansion to 4 lengths, 8, 16, 24 and 32, or even use dynamic programming to figure out optimal prefix lengths for the expansion.

We can reduce the tuple space dimension by eliminating the protocol field. As discussed earlier in the grid of tries, we can eliminate the Protocol field at the cost of increasing the memory by a factor of 3—the router replicates three times any filter with a * in the protocol field, using 3 values of the protocol, TCP, UDP, and Other. Thus, every hash key will have a fully-specified protocol field. The router builds 4 hash tables, one for each possible combination of port fields (both unspecified HT1, destination only HT2, source only HT3, and both specified HT4). See FIG. 20. Each hash table is a two-dimensional (destination-source) tuple space, where both source and destination prefixes are grouped in k lengths; the parameter k can be chosen to optimize time-space tradeoff.

The label of each hash table specifies how to compose a hash key when searching that hash table. For instance, when searching the hash table (DestPort, *), (i.e., HT2) the router concatenates appropriate bits of destination and source addresses, followed by the full Destination Port number.

In case destination and source addresses are arbitrary length CIDR prefixes, using the full tuple space can be very slow. Each rectangle has dimension 33×33 (prefix lengths vary from 0 to 32), and hence Rectangle Search takes 33+33−1=65 hashes per rectangle. Searching the four rectangles takes 260 hashes, which is clearly too slow.

We can reduce the tuple space significantly with the use of controlled expansion. For instance, by choosing the 3 most common prefix lengths 16, 24 and 32, the rectangle size can be reduced to 3×3. Then, each rectangle can be searched in 5 hashes, yielding the total worst-case search cost of 20 hashes, which should be sufficient even at Gigabit speeds. FIG. 20 illustrates the general construction.

In all-or-nothing (AON) filters, each field is either fully specified (to maximum bit length) or not specified at all. Thus, in a all-or-nothing filter, if the destination field is specified, it is either specified to a full 32 bits or left wildcarded. While prefix-filters are used for subnet-to-subnet rules, all-or-nothing filters are used for point-to-point (specific host to specific host) rules. AON filters are easier to process, and we show below that our Rectangle Search yields substantially better performance for these types of filters.

In AON filters, the D-S rectangles become 2×2 rectangles, since there are only two possible lengths for D or S (0 bits or 32 bits). Thus, the router can search each rectangle in 3 hashes, for a total search cost of 12 hashes.

It turns out that the search cost for the AON filters can be further reduced to 10 hashes by reorganizing the tuple space differently. In the following, we describe this improvement.

We need to introduce the concept of a specialized tuple space, called line. We say that a tuple space T is a line if the tuples of T can be linearly ordered as $T_1, T_2, \ldots, T_k$ such that $T_i$ is more specific than $T_{i-1}$, for i=2, 3, . . . , k. A line is a special case of a rectangle—in fact, each row or column of a rectangle is a line. It is possible to do a binary search in a line tuple space—each filter in $T_i$ leaves a marker at each tuple to its left, and each filter (or marker) $F \epsilon T_i$ also stores the least cost filter that is prefix compatible with F. It is easy to see that binary search in a line of dimension 1×3 takes 2 hashes.

FIG. 21 is a representation showing a different organization of the AON tuple space. It breaks the tuple space into 4 subspaces—a rectangle of size 3×3, two 1×3 lines, and a 1×1 rectangle, which is a point. Adding up the search times for these subspaces gives a total cost of 5+2+2+1=10 hashes.

The total memory required by this scheme is about 3N, including the memory blowup caused by eliminating the protocol field. In order to see this, consider the memory blowup in the main 3×3 Rectangle in FIG. 21. Let $N_1$ denote the number of original filters with protocol field *, and let $N_2$ denote the number of remaining filters; thus, $N=N_1=N_2$. Since port fields are only specified when the protocol is specified, each of the first $N_1$ filters have DestPort=* and SrcPort=*. When these filters are replicated, they all map to the first column of FIG. 21—this is the column with both designated ports as *. So, the total number of filters now is $3N_1+N_2$. The number of filters that reside in columns 2 and 3 is $N_2$, and each of these filters may leave markers in the columns 1 and 2. So, the markers add at most $2N_2$ new entries. The total number of filters and markers is at most $3N_1+N_2+2N_2=3N$.

There is clearly a tradeoff between memory and search time. We can reduce the search time to a single hash if the router builds a hash table containing all fully-specified destination-source pair addresses. The memory requirement for this scheme clearly makes it impractical, but it does illustrate the difficulty of proving a meaningful lower bound without making some assumptions about the memory use. A reasonable approach is to fix an upper bound on the allowable memory blowup, and then ask what is the best search time possible. In the following, we answer this question in the framework of hashing.

Given the general search paradigm, are there better search strategies than rectangle search? In a fairly general model of lookup schemes, all search strategies can be shown to require at least 10 hashes in the worst case for this case. In order to formulate the lower bound, we need to carefully specify the model of computation.

Suppose we have a tuple space that is in the form of a W×W rectangle. A search strategy can use hashing to query a cell of this rectangle. If there is a match, the procedure can use prefix compatibility to eliminate some set of tuples. If there is no match, the procedure can eliminate all tuples that are more specific that the searched tuple. It is reasonable to assume that regardless of the outcome of the search, the procedure cannot learn anything about the tuples that are incompatible with the searched tuple. Under this model, the question we ask is this: How many cells of the rectangle must be queried to find the answer? (The memory bound is implicit in the size of the tuple space—this space has size 32×32 when no memory blowup is allowed, and it has size $(32/k) \times (32/k)$ when a memory blow up by factor $2^k$ is allowed.)

We show that in the worst-case any hash-based search strategy must make at least 2W−1 hashes. This bound is tight, because our rectangle search finds the answer in these many hashes. Our lower bound argument uses a standard adversary approach: we show that it is possible to produce a set of filters such that unless the method queries both the main and the second diagonal of the matrix, it can be fooled into producing an incorrect answer. The main diagonal has W cells, and the second diagonal has W−1 cells, for a total of 2W−1.

Consider the rectangle RECT2 shown in FIG. 22. The white elements TUP1, TUP2, TUP3, TUP4, TUP5 and TUP6 represent tuples in the main diagonal from the lower left corner to the upper right corner. The shaded elements TUP7, TUP8, TUP9, TUP10, and TUP11 represent tuples in the diagonal parallel to but immediately below the main diagonal—we call this the second or lower diagonal. The router may face a filter database in which filters are placed in the main and second diagonals such that Tuple Search must examine every tuple in both the second and main diagonals. In particular for a square of size W×W, the lower bound is 2W−1, which matches the number of hashes taken by rectangle search.

The reasoning behind this result is that the tuples in any diagonal are incomparable tuples—for instance, a filter in T[i,j] has a longer destination prefix than one in T[i−1,j+1], but the latter has the longer source prefix. In the worst case, examining a tuple T gives no information about tuples that are incomparable to T. Thus for each diagonal by itself, we can use an adversary argument to show that if the router does not examine each tuple T' then we could always have placed the lowest cost filter at T'. It is trickier to show that tuples in both diagonals must be examined.

The lower bound argument can be generalized to arbitrary tuple spaces based on the notion of independent sets. For a database B, recall that tuples(B) represents the set of all tuples. We say that a set of tuples I forms an independent set in tuples(B) if the tuples in I belong to tuples(B) and are incomparable. Next define T as the set of tuples that belong to tuples(B) but are less than some element of I. Let I' be an independent set in T. Then we can show that a tuple search must examine at least |I|+|I'| tuples. For the rectangle, the largest I is the main diagonal, and the largest I' is the second diagonal.

The lower bound can also be extended to three dimensions to show that, for a W×W×W cube of tuple space, at least $\Omega(W^2)$ hashes are needed, which is no better than doing a separate rectangle search on each plane of the cube. Thus, there are diminishing returns as the dimension increases—in one dimension, binary search needs log W hashes for a line of size W; in two dimensions, Rectangle Search needs 2W−1 hashes for a rectangle of size W×W; in three dimensions, the number of hashes required is $O(W^2)$. The general lower bound also allows us to conclude that our search methods for the AON or CIDR prefix cases are nearly optimal. The results are summarized in FIG. 23, where all numbers are shown in hatches. The storage requirement is about 3N for Prefix-1, and about 3kN for Prefix-2, where k is the factor introduced by prefix expansion.

The lower bounds just described tell us that at least 2W−1 hashes are needed in the worst-case for searching a W×W rectangle. Next, we provide a refinement to the method, called Rope Search, that may help improve the lookup time on average. The idea behind Rope Search is to precompute a rope with each filter, which allows the router to skip columns that do not have any matching filters. A listing of structured pseudocode sufficient to implement the improved rectangle search with rope is shown in FIG. 24.

We use the destination-source filters to illustrate this refinement. Suppose we have a rectangular tuple space T of dimension R×C. Suppose a filter $F=(D_i, S_i)$ belongs to the tuple T[r,c]. The Rope associated with $(D_i, S_i)$ includes a column index, Rope[$D_i,S_i$].Col and a list of row indices, Rope[$D_i, S_i$].Rows. The entry Rope[$D_i, S_i$].Col is the first column after c that contains a filter (not a marker) compatible with F. The entry Rope[$D_i,S_i$].Rows contains the list of rows, with index smaller than r, that have filters (or markers) compatible with F in the column Rope[$D_i, S_i$].Col.

For instance, suppose Rope[$D_i,S_i$].Col=c' and Rope[$D_i, S_i$].Rows=$(r_1, r_2, r_3)$. Then, we must have c'>c and r>$r_1$, $r_2$, $r_3$. Furthermore, there must be a filter F'=(D',S') in T[$r_1$, c'] (original filter, not a marker) such that D' is a prefix of $D_i$, and $S_i$ is a prefix of S'. The tuples T[c',$r_2$] and T[c', $r_3$] satisfy the same condition, except they are only required to have either filters or markers compatible with F.

Thus, the use of Rope can speed up the search on average, since it allows the router to jump across several columns if there are no compatible filters in them. Rope does have some additional space requirement—for each filter, the router needs to store up to W extra indices. But it provides an additional time-space tradeoff in our method.

Both the binary search in one dimension and rectangle search in two dimensions improve the basic linear search by employing several optimizations. Thus, once the right optimizations are identified, one can view these two search techniques in similar terms. In the following, we describe three basic search optimizations that are central to efficient searching in multi-dimensional tuple spaces.

1. [Match Specialization:] Suppose TupleSet represents the current set of tuples to be explored by the search, which initially contains all possible tuples. At some point during the search, the router picks a tuple T in TupleSet and does a hash table lookup for the header H. We can modify the linear search as follows, depending on the outcome of the lookup. If the router finds a match, say, with a filter F, then it narrows the tuple set to TupleSet intersected with the filters that are compatible with F. If the router does not find a match, TupleSet remains the same except that T is deleted from it. Several further optimizations within Match Specialization are possible. For instance, the router can further narrow the set TupleSet to contain only those filters that have cost smaller than the cost of the current best matching filter.

2. [Subsuming Prefix Filters:] For each filter F, the router precomputes the least cost filter F' that is prefix compatible with F. The router uses storedCost and storedFilter fields to precompute this information. This corresponds to pruning the linear search further such that on a match with a filter F, the router narrows its tuple set to the intersection of TupleSet and those filters that are not prefix compatible with F.

3. [Markers for Filters:] Each filter in tuple T leaves markers at other tuples that will be searched before T, so that when no match is found, the router can safely eliminate the tuples following T. In the binary search, the makers are placed at the binary tree nodes along the path from root to tuple T; in Rectangle search, the markers are placed at all tuples left of T in its row.

In the above-described embodiments of the inventive method, we have assumed that the match in each header field is either an exact match or a prefix match. In some cases, the match may be specified by a range—a key x matches a range [b,e] if the value x lies between b and e. There is a standard procedure to transform a range into a set of prefixes, so that an arbitrary range in $[0, 2^L]$ can be specified using at most 2L prefixes. Thus, all our method embodiments apply to arbitrary ranges as well, once they are converted to prefix ranges.

Although the invention can be used in other contexts for fast determination of the best matching filter, we describe the invention in the context of a communication network that is used to forward messages (e.g., the Internet) or calls (e.g., telephone network). FIG. 25 shows a simplified block diagram of an example data communication network. It comprises devices called Routers (boxes) connected by communication links (shown as lines connecting boxes). Communication links include links such as fiber optic links, Ethernet links (which can connect more than one router), satellite links, etc. that allow a message to be sent directly between two routers. In case of a telephone network, the situation is similar except that messages are replaced by telephone calls and routers are often referred to as telephone switches. For the rest of this description, we will use the data communication network terminology.

The main function of a communication network is to route messages (sometimes called packets in data communications) sent by any source to any specified destination. FIG. 26 shows the format of a message sent by the source to a destination. The front of the message contains a link level header, followed by a routing header that is examined by routers. The routing header contains the destination address of the intended recipient, typically encoded as a binary number of 32 bits, a source address (32 bits) and a Protocol Field. The routing header also contains a visit count and other fields that vary in different routing protocols. If the Protocol Field is either TCP or UDP, the TCP/UDP protocol have an additional header that contains a Destination Port (16 bits) and a Source Port (16 bits) field.

Routers forward messages by looking up the message header fields in a Forwarding Table to determine the output link, and then forwarding the message to the corresponding output link. In order to reduce the size of Forwarding Tables, and for flexible policies, the Forwarding Table consists of a set of filters. Each filter may specify prefix fields for destination and source addresses, and sometimes for the port number fields. An address prefix represents a group of hosts whose addresses all begin with that prefix. For example, in FIG. 25, Routers 200, 300 and 400 and the destinations they serve are described by Prefix 1*. Prefixes may be nested within other prefixes. In FIG. 25, Routers 300 and 400 can reach the prefix 100*, which is contained in the group covered by prefix 1*.

The router forwarding table will store the corresponding output link to reach every destination that it knows about (this information is obtained using various routing update protocols). For example, Router 100 could contain an entry that says that the pure destination prefix 1* is reachable through Link 201. However, it may contain a filter F that specified that video traffic (identified by Destination Port= 52, for example) sent to destination prefix 100* is to be sent through Link 601. It may also contain a Filter G, which is listed below F in the forwarding database, that specifies that traffic to destination prefix 100* is to be sent through Link 201. The intent of Filters F and G is that video traffic to destination addresses that start with 100 should be sent on Link 601, while other traffic to 100* should be sent on Link 201. This may be useful if Link 201 is a slow link, and we want to route the higher priority video traffic on the faster Link 601.

To forward a message, the router must lookup its forwarding table for any filters that match the headers in the message. If more than one filter matches, the router picks the filter that occurs first. For example, in forwarding a message to an address whose first three bits are 100 and whose destination port is 52, this message matches both F and G; however, F is the first match, and so the message must be sent to Link 601. Note that FIG. 25 is only an extremely simple example of a routing network or internetwork. In particular, to keep things simple, we have only shown filters that use two fields, the Destination and Destination Port fields. However, the inventive embodiments described herein are clearly applicable to other combinations of headers and other networks and network protocols built along similar principles that use best matching filter forwarding.

Figure 27:
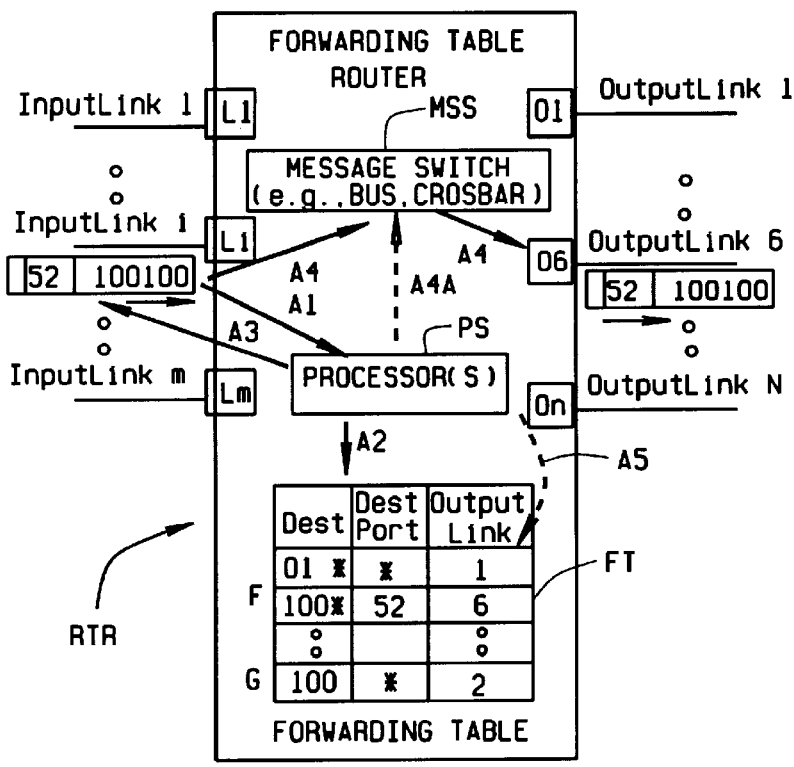
FIG. 27 is a simplified block diagram of a router in accordance with the invention.

We can now describe the workings of a router (e.g., Router 100 in FIG. 25). A router RTR, as illustrated in FIG. 27, comprises Input Links L1 through Lm, and corresponding output links O1 through On (in most cases, a router has the same number of input and output links but not always). Corresponding to each input link there is a link interface (L1 through Lm) and corresponding to each output link there is a link interface (O1 through On). Each link interface contains the circuitry to send and receive messages on a particular link, and (possibly) buffers to store messages temporarily before they are forwarded.

The two other main components of a router are a message switch subsystem MSS and a processing subsystem PS (see FIG. 27). The processing subsystem PS could be a single processor, group of processors, a processor per link, or various hardware state machines. The message switch subsystem MSS is responsible for switching a message from an input link interface to an output link interface under command from the processing subsystem PS. Typical message switch subsystems contain one or more computer busses, a crossbar switch, or more sophisticated switching systems. In some routers the switching subsystem function is performed by one of the processors; in some cases, it is done by independent hardware.

A typical sequence of steps for forwarding a message in accordance with the invention is as follows. When a message arrives at, say, Input Link i, it is stored in the corresponding link interface. Some time later, a processor in the processing subsystem reads the header fields (A1 in FIG. 27), then does an header lookup (A2). The result of the header lookup specifies the output link corresponding to the longest prefix match and the forwarding directive act. If the directive specifies that the message be dropped (e.g., to implement firewalls) that is done. If not, the message is forwarded according to act to the output link. For example, act may also specify which queue to be used for this message and the amount of bandwidth to be reserved for this type of message.

Some fields in the message are then (A3) updated (e.g., often a visit count is incremented and the link headers are sometimes updated). Finally the message is switched (A4, A4A) to the specified output link. This is done by the CPU specifying the details of the message, input and output links to the switching subsystem (shown by dotted arrow labeled A4A). The switching subsystem then actually transfers the message (shown by solid arrows labeled A4).

For example, a message sent to destination address that starts with 100 and Port 52 in FIG. 27 is matched to filter F and is switched to output Link 6. Returning to FIG. 25, it will be appreciated that a message from the source to the destination, is sent by having each router in the path perform similar steps.

Finally, in FIG. 27, we illustrate one more function performed by a router. Periodically, when the router gets new routing updates from other routers, the router RTR may rebuild its forwarding table FT to add or delete some filters (A5).

Application of the invention to make the header lookup (A2) process faster and scaleable to much larger forwarding tables is now described.

Figure 28:
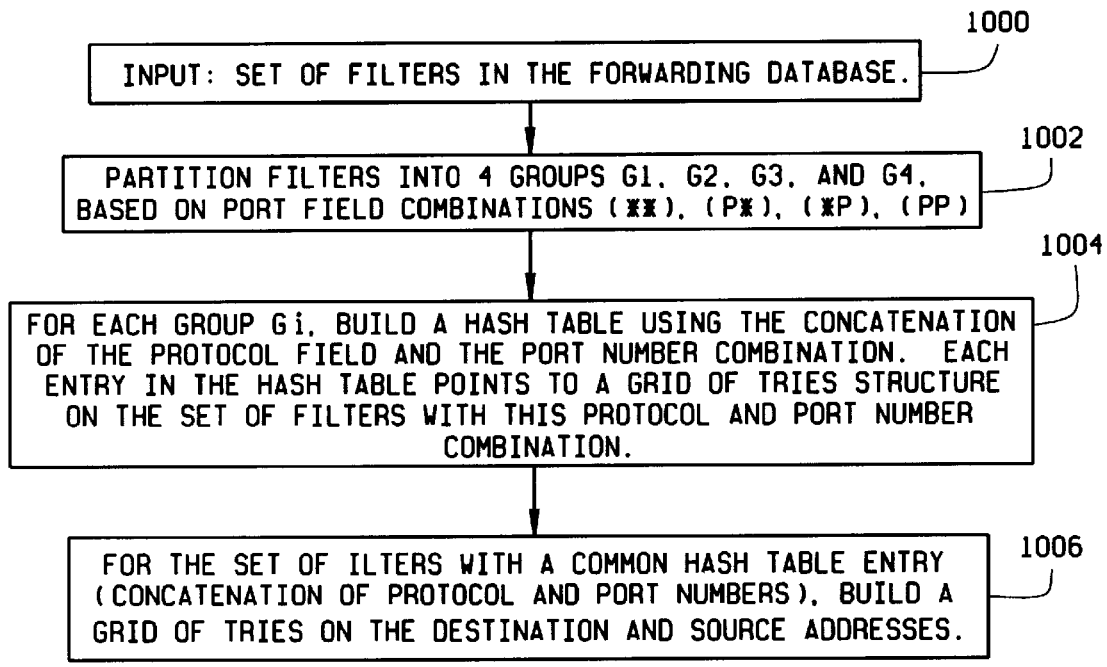
FIG. 28 is a flow chart showing the building of a grid of tries data structure in a memory of a router.

Referring to FIG. 28, which is a flow chart of the procedure, we start with a set of filters that the router receives from routing updates or based on a network manager commands at block 1000. Some filters, such as pure destination prefixes, will almost certainly come from routing protocol updates. Any standard textbook on routing (e.g., *Interconnections* by Radia Perlman) describes how routers receive information about destination prefixes from each other. Some filters, such as firewall filters, will almost certainly be manually configured by a manager. Any standard text on Firewalls (e.g., *Firewalls: Catching the Wily Hacker* by Cheswick and Bellovin) will describe how managers configure firewalls. In the following, we give a detailed procedure for building our data structures and using them for the packet filtering problem.

The router divides the input set of filters into four groups, $G_1$, $G_2$, $G_3$, $G_4$, depending on the port field specifications at block 1002. $G_1$=(* *) has filters with neither the destination nor the source port number specified; $G_2$=(P *) has filters with destination port specified, but not the source port; $G_3$=(* P) has source port specified, but not the destination; and finally $G_4$=(P P) has both the port numbers specified. As discussed before, with a slight increase in memory, the router gets rid of the wild cards (*) in the protocol field by replicating these filters three times. So, we assume from now on that every filter has a specific value in the protocol field (such as TCP, UDP, or "Other Protocol".)

For each group $G_i$, the router builds a hash table $H_i$, which stores all port combinations in that group at block 1004. The key for hash table construction is the concatenation of the protocol and the port numbers. So, for instance, $G_1$ has keys of the form (TCP * *), (UDP * *), (Other * *). The keys for group $G_4$ have the form (Protocol P1 P2), where Protocol is one of the protocol field values, P1, P2 are port numbers, and some filter in $G_4$ has the combination P[3]=Protocol, P[4]=P1, and P[5]=P2. Similarly, groups $G_2$ and $G_3$ use the concatenation of protocol and one of the port fields. This part of the construction clearly takes O(N) time and space, where N is the number of filters, since each filter belong to exactly one group.

Figure 29:
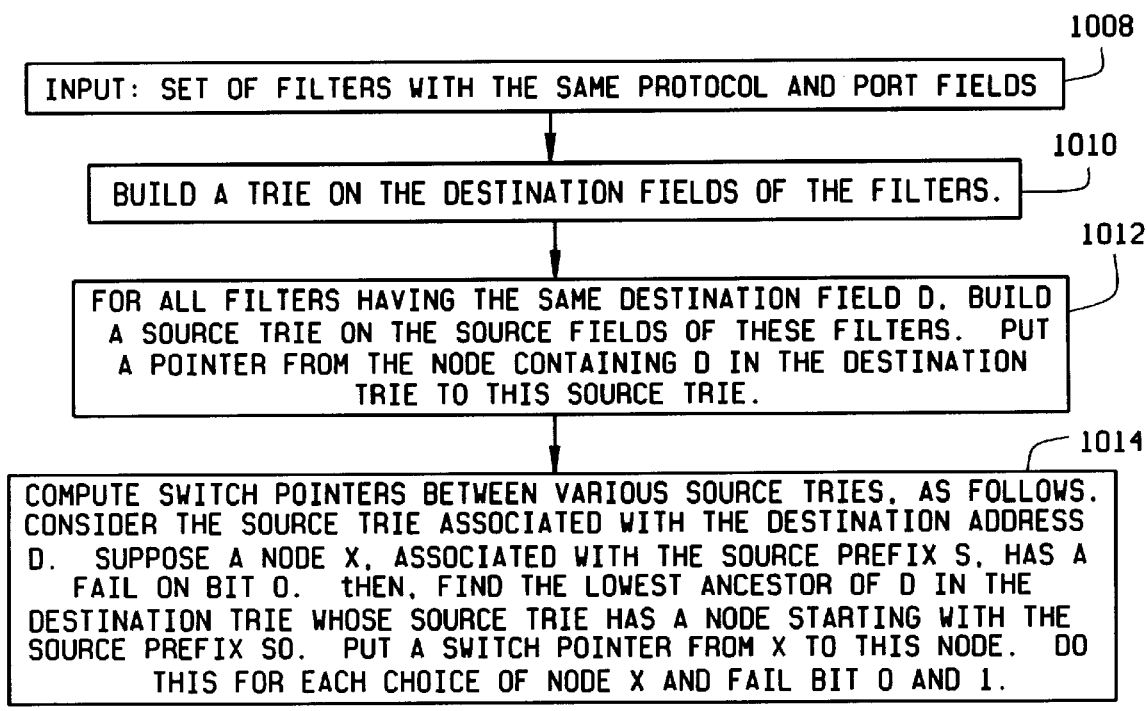
FIG. 29 is a flow chart showing the construction of the grid of tries on destination-source fields.

Next, each entry in the hash tables $H_i$ is set up to point to a grid of tries data structure that stores all the filters matching the hash key in block 1006. For instance, the grid of tries pointed to by the entry (TCP * *) in hash table $H_1$ stores those filters that have F[3]=TCP, F[4]=* and F[5]=*, and similarly for the other entries. The grid of tries is a two-level trie data structure, as described above. A flow chart detailing this construction is shown in FIG. 29, which proceeds from block 1008 to block 1014 and contains sufficient detail to be self-explanatory. Notice that each filter in this scheme is stored in exactly one trie. Each trie requires O(W) space to store a source or destination prefix, where W is the maximum number of bits specified in a source or destination field. Each node in a source trie stores at most 2 switch pointers. Thus, the total memory requirement for this scheme is O(NW). The data structure can be built in $O(N^2W)$ time, since each switch pointer and storedFilter( ) can be determined by a linear pass through the filter database in the worst case.

Figure 30:
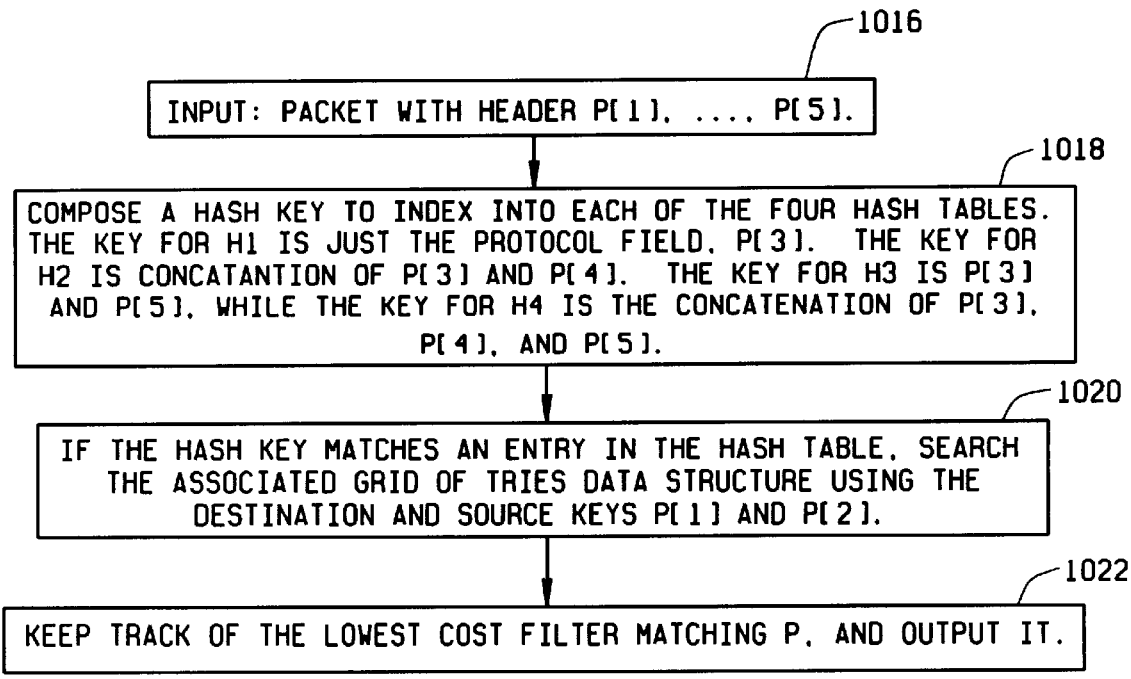
FIG. 30 is a flow chart of packet filtering using the grid of tries data structure.

Referring to FIG. 30, given a packet P with header (P[1], P[2], P[3], P[4], P[5]) at block 1016, the inventive search method works as follows. The router searches each hash table in turn, using the appropriate hash key for each search at block 1018. For instance, the router first uses just the protocol field as the key, and hashes into the table $H_1$. If there is a match, the router searches the grid-of-tries pointed to by this entry using the fields P[1] and P[2] at block 1020. To hash into the table $H_2$, the router uses the concatenation of P[3] and P[4], and so on. The router keeps track of the lowest cost filter matching P, as illustrated in block 1022.

Figure 31:
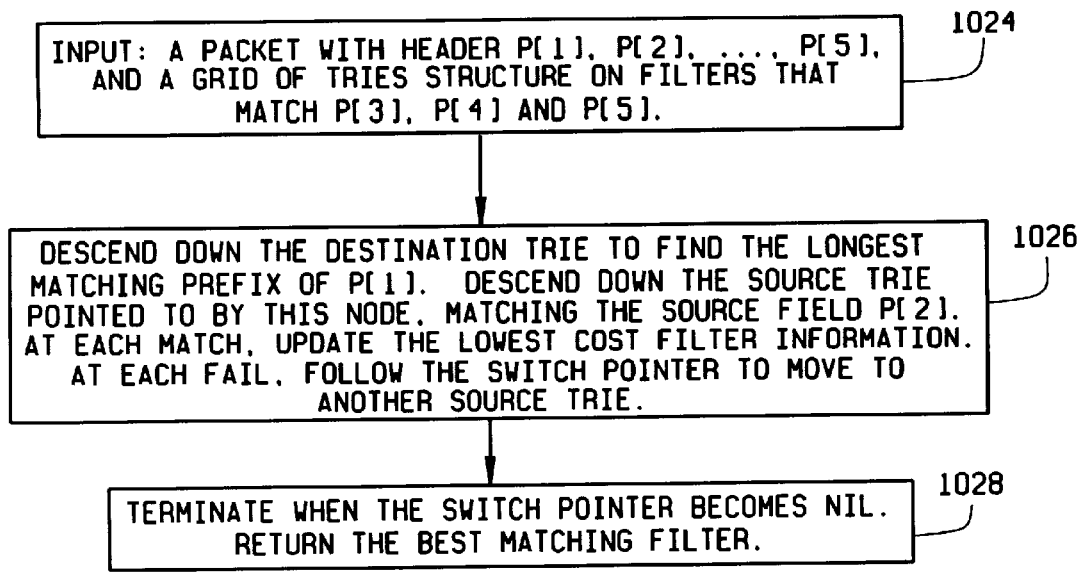
FIG. 31 is a flow chart of the grid of tries search using destination-source pairs.

Referring to FIG. 31, once a match is found using the protocol and port fields key, the router searches the associated grid of tries for destination-source match. Given the input at block 1024, the router first traverses the destination grid using the destination field P[1] as key at block 1026. Let u be the node with the longest match with P[1]. If D is the destination string stored at u, then D is the longest matching destination prefix for P[1]. The router now starts searching the source trie pointed to by u, using the source field P[2] as key. In this search, whenever there is a match found at a node v, the router updates the best matching filter cost by comparing the storedFilter( ) at the node v. Whenever the router cannot continue down the source trie, because no longer match exists, the router uses the switch pointer to move to the next source trie. (This source trie is associated with an ancestor of u, which means that the destination address at the node is a prefix of D, and the switch pointer guarantees a longer match on the source address P[2].) This search terminates at block 1028 when the switch pointer becomes nil, and the best matching filter is returned.

We now discuss the search cost. The search involves a longest matching prefix search in the destination trie, followed by source address search in the source tries. The first part of the search clearly takes at most W steps, since the destination trie has height at most W. The source address search can involve multiple tries, but since the prefix matching the source address P[2] increases by at least 1 bit in each step, the total search cost is again at most W. Indeed, by using the best matching prefix method in M. Waldvogel et al., "Scalable High Speed IP Routing Lookups," *Proc. SIGCOMM* 97, October 1997 for the longest matching destination prefix, we can improve the first part of the search to O(log W), giving us an O(log W+W) time procedure.

Figure 32:
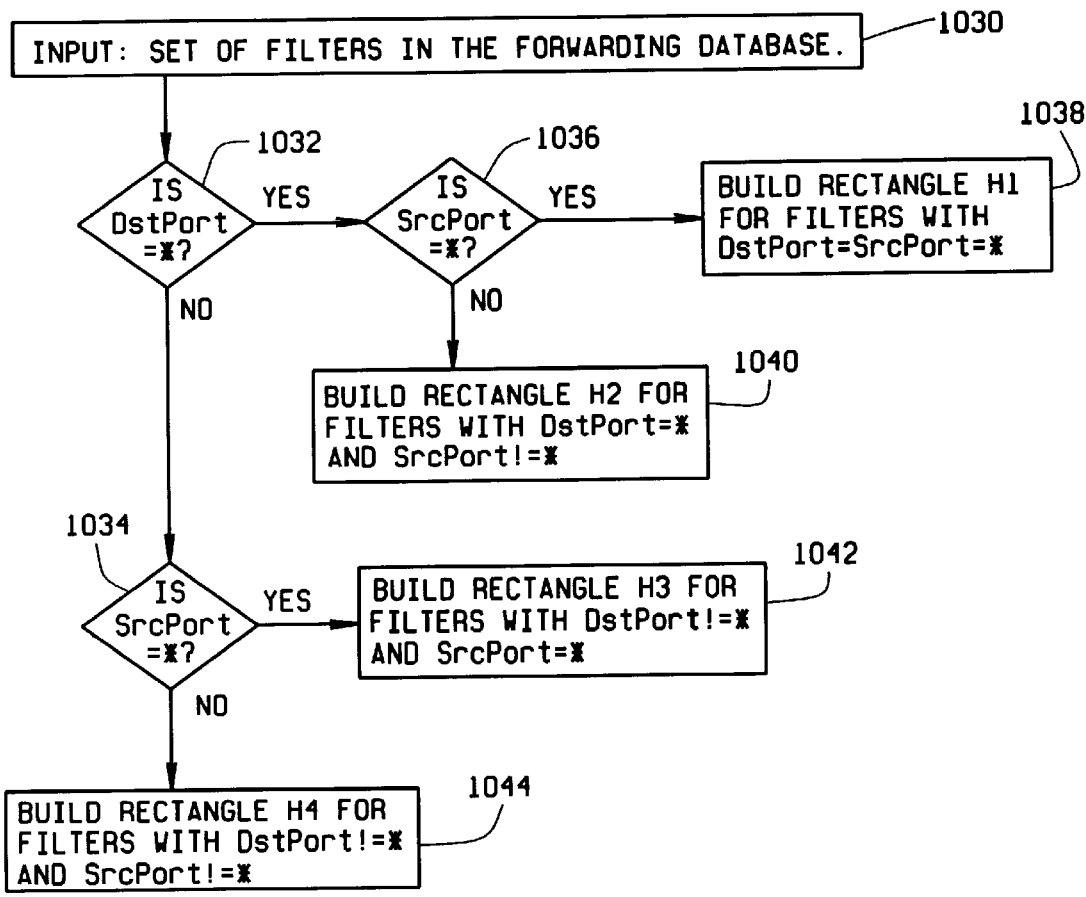
FIG. 32 is a flow chart for building a tuple search data structure when source and destination addresses use CIDR prefixes.

The basic unit of the tuple space algorithm is the rectangle. When the source and destination addresses are the CIDR prefixes, the router builds 4 rectangles $T_1, \ldots, T_4$, depending on the four combinations of the port fields. (As in the Grid of Tries algorithm, we assume that the protocol field has been eliminated with appropriate replication of filters.) FIG. 32 shows a flow chart for constructing the top level data structure. The rectangle $H_1$ contains filters for which DstPort=SrcPort=*; rectangle $H_2$ has filters with DstPort=* and SrcPort≠*; rectangle $H_3$ has filters with DstPort≠* and SrcPort=*; finally rectangle $H_4$ has filters with DstPort≠* and SrcPort≠*. Given the input at block 1030, decision blocks 1032, 1034, and 1036 determine which of rectangles $H_1$, $H_2$, $H_3$, or $H_4$ is built at blocks 1038, 1040, 1042, and 1044. The dimension of each rectangle depends on the number of different prefixes that are selected for controlled expansion. In the most basic case, when no expansion is done, each rectangle has dimension (W+1)×(W+1). If T is a tuple in one of these rectangles, then the hash key for searching in this tuple is obtained by concatenating the T[1] bits of destination, T[2] bits of source, the protocol field, and the port numbers as specified by the Rectangle.

Figure 33:
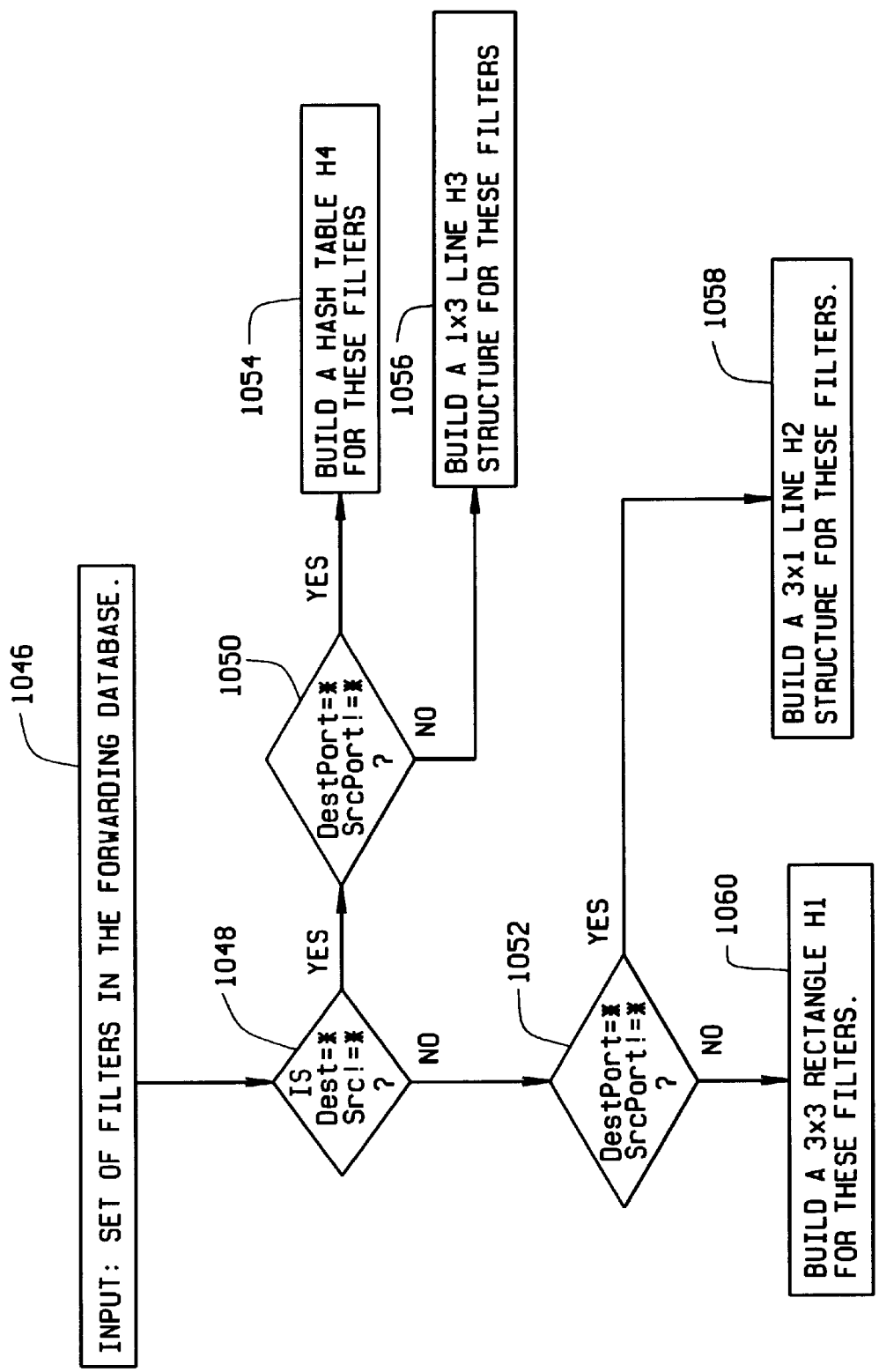
FIG. 33 is a flow chart for building a tuple search data structure when the filters are of the all-or-nothing kind.

If all the filters are of the all-or-nothing kind, then the hash tables are organized differently. Specifically, FIG. 33 shows a flow chart for building 4 rectangles—only one of these is a real rectangle, the others are either a line or a point. The similarities and differences between FIGS. 32 and 33 will be evident to a reader skilled in the art so that such a reader will not require a detailed explanation of FIG. 33, in view of the detailed explanations of the methods provided elsewhere herein.

Figure 34:
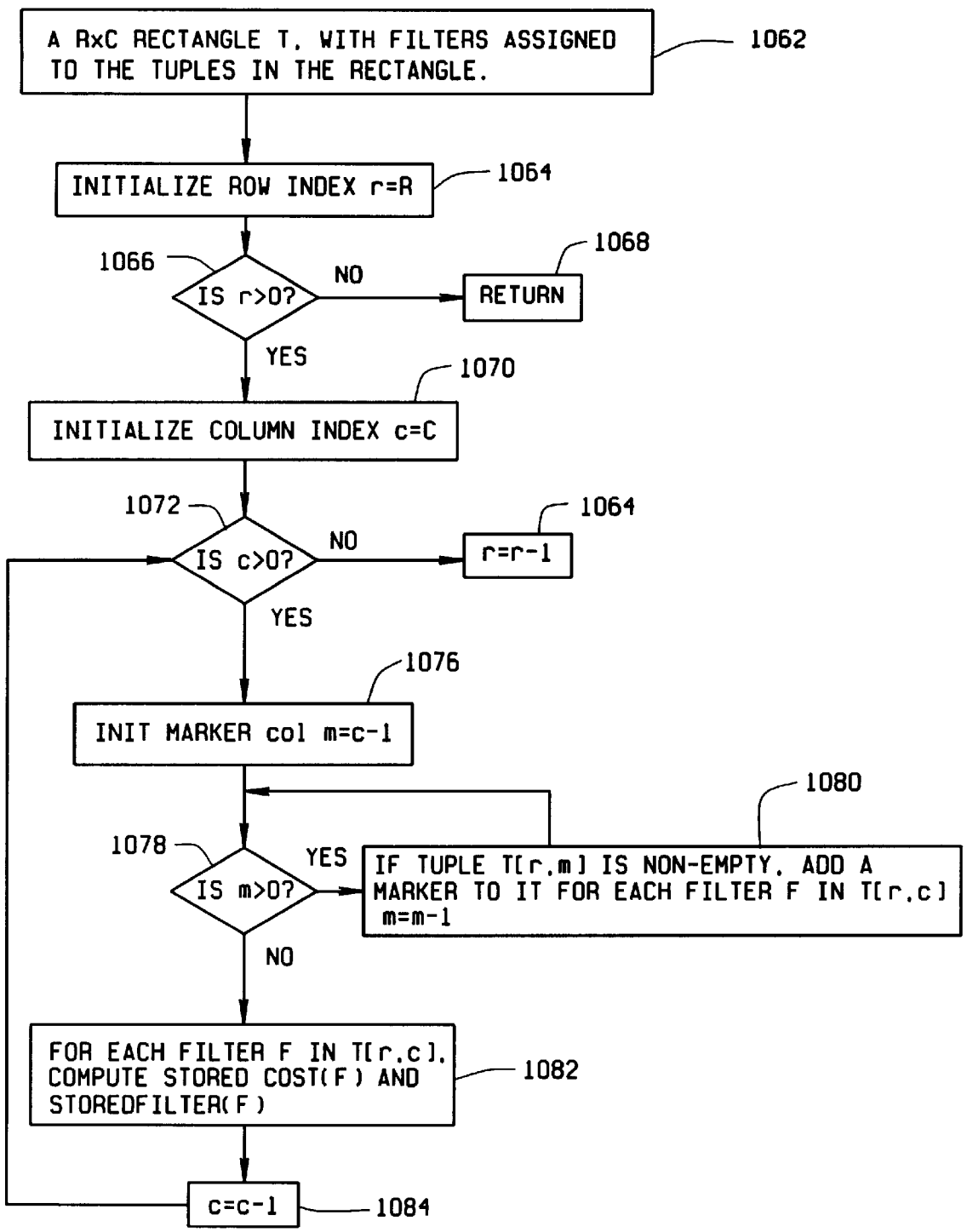
FIG. 34 is a flow chart of precomputation and marker placement for the rectangle search method refinement.

In both the CIDR and AON cases, the filters are mapped to unique tuples within the rectangles. In order to carry out the Rectangle Search, however, the router must perform some precomputation as well as marker placement. This step is illustrated in FIG. 34. FIG. 34 is entered at block 1062 with an R×C rectangle T, with filters assigned to the tuples in the rectangle. The row index r is then initialized to R in block 1064. In block 1066, a test is performed to determine whether r is greater than 0, and if not, the function returns at block 1068. Otherwise, the column index c is initialized to C in block 1070. Next, a test is performed at block 1072 to determine whether c is greater than 0, and if not, r is decremented by one at block 1074 and the column index is reinitialized at step 1070. Otherwise, a column marker m is initialized to c–1 at block 1076. If m is greater than 0 at block 1078, then the following is done at block 1080: if tuple T[r,m] is non-empty, a marker is added to it for each filter F in T[r,c], m is decremented, and control is returned to block 1078 for another test. If m is not greater than 0 at block 1078, then, for each filter F in T[r,c], the storedCost(F) is computed, as is the storedFilter(F), in block 1082. After execution of block 1082, c is decremented by one at block 1084, and control returns to block 1072, where the value of c is decremented.

Figure 35:
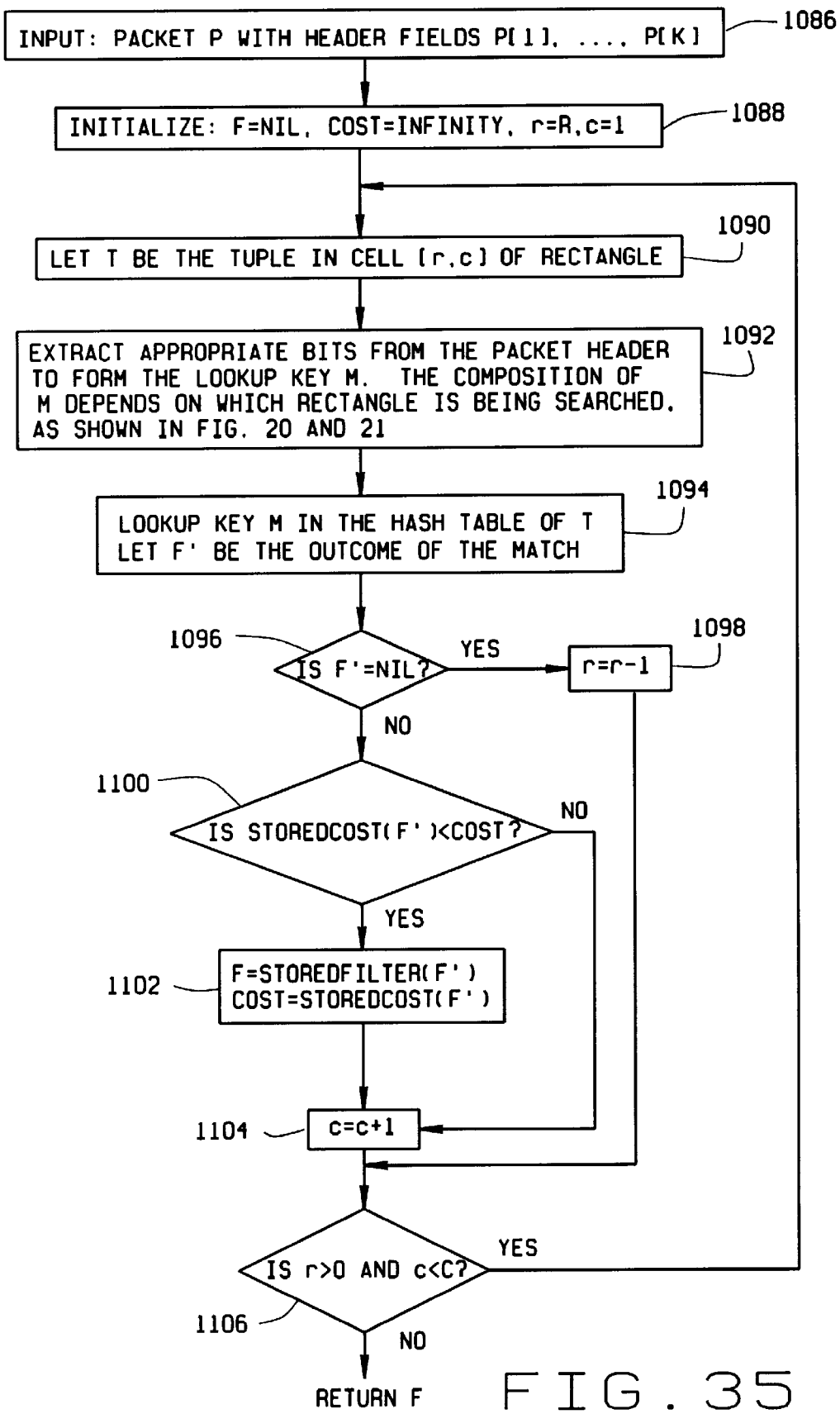
FIG. 35 is a flow chart of packet filtering using the rectangle search data structure.

Finally, FIG. 35 shows the flow chart of the Rectangle Search. The flow chart assumes that the rectangle has dimension R×C. This flow chart is entered at block 1086 by inputting a packet P with header fields P[1], . . . , P[K]. This is followed by an initialization step at block 1090, where F is initialized to nil, cost is initialized to infinity, r is set to the value R, and c is set to the value 1. Next, at block 1092, T is set to the tuple in cell [r,c] of Rectangle. At block 1092, appropriate bits from the packet header are extracted to form a lookup key M. The composition of M depends upon which rectangle is being searched, as shown in FIGS. 20 and 21. Next, at block 1094, M is looked up in the hash table of T. F' is set to the outcome of this match. If F' is nil at block 1096, r is decremented by 1, and control passes to block 1106. Otherwise, a check is made at block 1100 to determine whether storedCost(F') is less than cost. If so, execution continues at block 1102 by setting F equal to storedFilter(F') and cost equal to storedCost(F'), otherwise, execution skips to block 1104, which would occur in any event after execution of block 1102. At block 1104, c is incremented by one.

Next, at block 1106, a check is made to determine whether r is greater than 0 and c is less than C. If so, execution continues by looping back to block 1090. Otherwise, the value F is returned out of this routine.

The grid-of-tries and tuple-space search procedures are basically designed to efficiently search filter databases with two arbitrary prefix fields. As discussed above, they can be extended to more general filters by partitioning the filter database into several parts, where each part has constant values in the remaining fields. This works well as long as the remaining fields have only a few distinct combinations. But if the number of combinations becomes large, as with filters containing port number ranges, then the method loses its efficiency.

A general procedure exists that can handle arbitrary filters, allowing range matches in some fields. The router divides the filter database into one or more grid-of-tries or rectangle databases. Each database comprises entries corresponding to filters that have prefix entries in two fields, and have a common value in the remaining fields. The two prefix fields can be different in different databases. Additionally, the router provides a default database that contains all the remaining filters. In general, the default database is a good choice for filters with range fields, because they may expand to too many constant value combinations.

Figure 36:
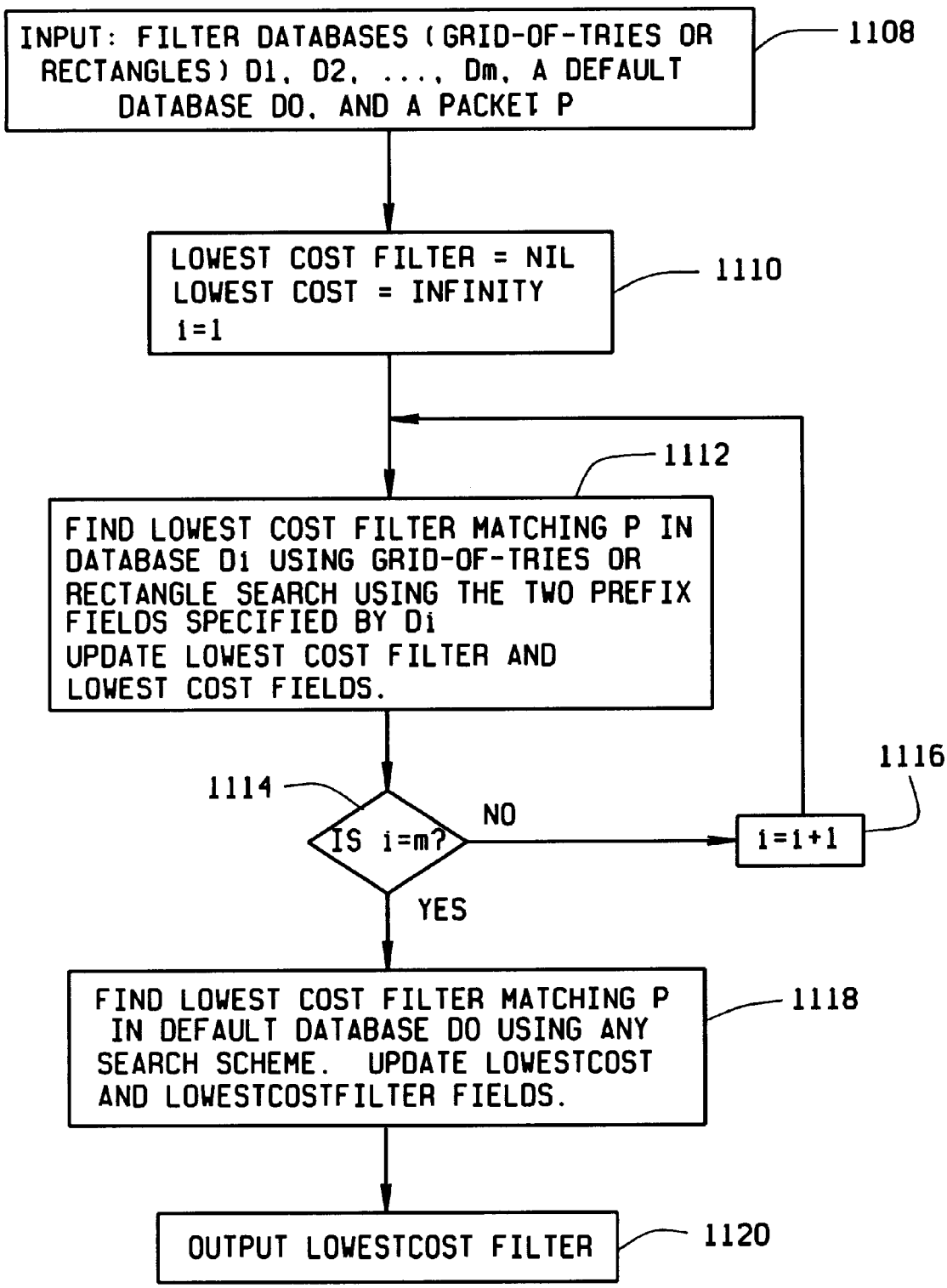
FIG. 36 is a flow chart of a combination method in accordance with another embodiment of the invention with multiple grid-of-tries (or rectangle search) databases plus a default database.

FIG. 36 gives a flow chart for this general strategy. In this flow chart, filter databases (either grid-of-tries or rectangles) are input at block 1108 together with a default database and a packet. The lowest cost filters, the lowest cost, and a counter are all initialized in the next block at 1110. Next, the lowest cost matching filter is found in the first filter database using either a grid-of-tries or a rectangle search using the specified prefix fields, and the lowest cost filters and lowest cost variables are updated in block 1112. A decision is then made at block 1114 as to whether the counter has reached the last database, and if not, the counter is incremented, and control returns to block 1112, where the next database is searched. On the other hand, if the decision at block 1114 indicates that the last database (other than the default database) has been searched, control proceeds to block 1118, where the default database is searched, using any suitable search method. The lowest cost and lowest cost filter variables are also updated here. Finally, the lowest cost filter is ouput at block 1120.

Observe that the procedures whereby the grid is extended to handle protocols and ports and the procedure whereby tuple space is expanded to handle protocol field and port numbers are special cases of this more general method, where the default database is null and the constant fields are organized in four groups, depending on whether or not the port numbers are specified. In the general method, the router searches each grid-of-tries or rectangle database in turn, using the two specified prefix fields. The default database can be searched using any search scheme, including a linear search.

Of course, many extensions and variations of the methods and devices disclosed herein will occur to one skilled in the art. Such extensions and variations are considered to be within the scope of the invention, inasmuch as the examples provided above are intended for illustrative purposes. The scope of the invention should thus be determined by reference to the claims below, including all equivalents under applicable law in light of the specification.

What is claimed is:

1. A method for routing a data packet through an electronic routing device having an input data link and a plurality of output data links, the data packets having at least a first field and a second field, the method comprising:

a) searching a first trie in a memory of the electronic routing device for a record containing a longest prefix match of the first field of the data packet;

b) searching a second trie associated with the longest prefix matching record of the first trie for a record containing a lowest cost match of the second field of the data packet; and c) routing the data packet on an output data link corresponding to the lowest cost matching record.

2. The method of claim 1 wherein the step of searching a first trie includes the step of searching a multi-bit trie.

3. The method of claim 1, wherein the data packet comprises at least one additional field, and wherein there are a plurality of first tries and a plurality of hash tables in a memory of the router, the hash tables containing entries referencing individual ones of the first tries and being indexed by entries of the at least one additional field; and further comprising:

searching each of the hash tables for a matching entry to the at least one additional field;

searching each grid-of-tries referenced by the matching entries in each hash table for a lowest cost match corresponding to each hash table;

selecting a final lowest cost match of all of the lowest cost matches found; and routing the data packet to the output data link corresponding to the final lowest cost match of the lowest cost matches.

4. The method of claim 3, further comprising searching a default database for an additional lowest cost match.

5. A method for routing a data packet through an electronic routing device having an input data link and a plurality of output data links, the data packets having at least a first field and a second field, wherein each record of a first trie corresponding to a prefix match of the first field of the data packet references an associated second trie containing only records corresponding to filters exactly matching the prefix match of the first field, the method comprising:

a) searching the first trie in a memory of the electronic routing device for a record containing a prefix match of a first field of the data packet;

b) searching a second trie associated with the record found in step (a) for a record containing a minimum cost match of a second field of the data packet, the record containing a reference to one of the output data links;

c) repeating steps (a) and (b) until all of the matching prefixes in the first trie and the corresponding minimum cost matches of the second field of the data packet are found;

d) selecting the lowest cost match of the minimum cost matches; and e) routing the data packet to the output data link referenced by the record which is the lowest cost match.

6. The method of claim 5 wherein the repeating step comprises backtracking up the first trie.

7. The method of claim 6 wherein at least one of the second tries (T2A) associated with a record (R1) in the first trie comprises at least one record containing a switch pointer pointing to a second trie (T2B) having a top record associated with ancestor record (R2) in the first trie, and the step of backtracking up the first trie comprises following the switch pointer from trie T2A to trie T2B.

8. A method for routing a data packet through an electronic routing device having an input data link and a plurality of output data links, the data packets having at least a first field and a second field, the method comprising:

a) mapping a filter database B comprising N filters, into a rectangular hash table T, where each entry T[i,j] contains all filters F matching i symbols of the first field and j symbols of the second field of a data packet, and includes records containing associated costs for the filters F;

b) for each pair of values i and j in hash table T: extracting i symbols from the first field of the data packet and j symbols from the second field of the data packet, finding a matching entry in hash table T corresponding to a filter matching the i symbols of the first field and the j symbols of the second field of the data packet and determining the cost associated with each matching filter;

c) selecting the matching filter having the least cost; and d) routing the data packet to the data link corresponding to the selected matching filter having the least cost.

9. A method for routing a data packet through an electronic routing device having an input data link and a plurality of output data links, the data packets having at least a first field and a second field, the data packets being routed in accordance with preselected routing filters each having an associated cost and output data link, the method comprising:

a) selecting a lower left corner tuple of a rectangle of tuples having r rows and c columns, the selected tuple becoming a current tuple;

b) searching for a filter keyed by bits of fields of the data packet corresponding to the current tuple;

c) until a first row or last column is reached, selecting a next tuple of the rectangle of tuples in an adjacent row above and in a same column as the current tuple when the searching step is unsuccessful, and selecting a next tuple of the rectangle of tuples in the same row as, and in an adjacent column to the right of the current tuple if the search is successful, wherein the current tuple ceases to be the current tuple and the selected tuple thereby becomes the current tuple;

d) selecting a filter of those found in the searching step having a lowest associated cost; and e) routing the data packet to the output data link corresponding to the filter selected in the filter selecting step.

10. The method of claim 9 and further comprising precomputing the rectangle of tuples so each tuple in the rectangle is more specific than any other tuples in the rectangle of tuples that are both to its right and below it.

11. The method of claim 10, and further comprising precomputing and storing, in association with each tuple T containing at least one filter and having at least one tuple in the rectangle of tuples to the upper left of tuple T, a filter of least cost of all filters to the upper left of tuple T containing at least one filter.

12. The method of claim 11, wherein searching for a filter comprises searching a hash table keyed by a concatenation of a number of bits of fields of the data packet corresponding to the current tuple.

13. The method of claim 12, wherein a set of all lengths of all the filters in the hash table forms a proper subset of all possible lengths.

14. The method of claim 11, and further comprising:

constructing a first field hash table in memory, the first field hash table having records containing expanded prefixes of matching first fields in the filters;

constructing second field hash tables in memory, the hash tables each containing expanded prefixes of matching second fields in the filters, each second field hash table containing records reflecting lowest cost matching filters corresponding to records in the first field hash table; and associating pointers with each record in the first field hash table to a corresponding second field hash table containing lowest cost matching filters for the record in the first field hash table;

and wherein the searching for a filter comprises searching the first field hash table for a match to a first field of the data packet, and searching the second field hash table pointed to by the pointer associated with the match in the first field hash table for a match to a second field of the data packet corresponding to a lowest cost filter.

15. The method of claim 14, wherein a set of all lengths of all the filters in the hash tables form a proper subset of all possible lengths.

16. The method of claim 15, wherein the data packet is an Internet data packet in accordance with Internet Protocol (IP), the first field is a destination field and the second field is a source field.

17. A method for routing a data packet through an electronic routing device having an input data link and a plurality of output data links, the data packets having at least a first field and a second field, the data packets being routed in accordance with preselected routing filters each having an associated cost and output data link, the method comprising:

a) selecting a lower left corner tuple of a rectangle of tuples having r rows and c columns, the selected tuple becoming a current tuple;

b) searching for a filter keyed by bits of fields of the data packet corresponding to the current tuple;

c) until a first row or last column is reached, selecting a next tuple of the rectangle of tuples in a row above and in a same column as the current tuple when the searching step is unsuccessful, and selecting a next tuple of the rectangle of tuples in the same row as, and in a column to the right of the current tuple in accordance with a rope value associated with the current tuple when the searching step is successful, wherein the current tuple ceases to be the current tuple and the selected tuple thereby becomes the current tuple;

d) selecting a filter of those found in the searching step having a lowest associated cost; and e) routing the data packet to the output data link corresponding to the filter selected in the filter selecting step.

18. A method of routing a data packet using a set of filters that are based upon bit fields within the data packet, the bit fields including a destination field and a source field, each filter also specifying, or having been replicated so as to specify, a specific value of protocol field, and each filter also specifying an output port and having an associated cost, the method comprising:

a) dividing the set of filters into four groups, a first group of filters consisting of filters specifying neither a source field value nor a destination field value; a second group of filters consisting of filters specifying a destination field value but no source field value, a third group of filters consisting of filters specifying a source field value but no destination field value, and a fourth group of filters specifying both a source field value and a destination value;

b) for each group of filters, constructing a corresponding hash table storing, as records, all source field value and destination field value combinations in the group, including concatenated protocol field specifications;

c) for each record in the hash tables, storing a pointer to a grid of tries data structure including a plurality of tries storing all filters matching the record;

d) for each data packet received, searching each of the hash tables for a match to a record keyed to the bit fields within the data packet;

e) for each matching hash table record, searching the trie pointed to for a matching entry for the destination field value and source field value of the data packet;

f) routing the packet to the data port specified by the filter corresponding to a matching entry found in the searches of the grid of tries having a lowest cost.

19. The method of claim 18, wherein the grids of tries comprises nodes including switch pointers, and searching the grid of tries comprises:

updating a best matching filter cost variable in memory whenever a match is found at a node in the searched trie;

searching down the searched trie for a longer match to the destination field value and source field value until the searched trie terminates; and when searching does the searched tries fails to provide a longer match, searching a trie pointed to by a switch pointer associated with the last matched node in the searched trie.

20. A method of routing a data packet using a set of filters that are based upon bit fields within the data packet, the bit fields including a destination field and a source field, each filter also specifying, or having been replicated so as to specify, a specific value of protocol field, and each filter also specifying an output port and having an associated cost, the method comprising:

a) dividing the set of filters into four groups, a first group of filters consisting of filters specifying neither a source field value nor a destination field value; a second group of filters consisting of filters specifying a destination field value but no source field value, a third group of filters consisting of filters specifying a source field value but no destination field value, and a fourth group of filters specifying both a source field value and a destination field value;

b) constructing rectangular databases of tuples, one for each of the four groups of filters, the rows and columns of the rectangles corresponding to a number of bits of the destination field, source port field, protocol field, and port numbers that form a hash key for searching a tuple at a specified row and column;

c) associating each filter to a unique one of the tuples;

d) associating a precomputed stored cost and stored filter for each filter in each tuple; and e) for each received data packet, and for each rectangular database of tuples starting at a last row and first column of each rectangular database of tuples, performing a rectangular search for a lowest cost matching filter;

f) selecting, of the lowest cost matching filters found corresponding to each rectangular database of tuples, the one of these matching filters having the lowest cost; and g) routing the data packet in accordance to the matching filter selected in step f) above.

21. A device for routing a data packet having at least a first and a second field, the device comprising:

an input data link at which the input data packet arrives;

a plurality of output data links;

memory containing a first trie of records and a set of second tries of records associated with records of the first trie;

means coupled to the input data link for receiving the data packet and for searching the first trie of records in memory for a record having a longest prefix match of the first field of the data packet;

means, responsive to the means for receiving and for searching the first trie of records, for searching a second trie of records in memory associated with the matched record in the first trie of records for a lowest cost match of the second field of the data packet;

and means, responsive to the means for searching a second trie of records, for routing the data packet to the output data link corresponding to the lowest cost match.

22. A device for routing a data packet having at least a first and a second field, the device comprising:

an input data link at which the data packet arrives;

a plurality of output data links;

memory containing a first trie of records and a set of second tries of records associated with records of the first trie, with records in the set of second tries including references to output data links;

first means coupled to the input data link for receiving the data packet and for searching the first trie in the memory for a record containing a prefix match of the first field in the data packet;

second means, responsive to the first means, for searching a second trie associated with the record, found by the first means, to find a record containing a minimum cost match of the second field in the data packet and a reference to one of the output data links;

third means, coupled to the first means and the second means, for causing the first and second means to repeat their respective functions until all matching prefixes in the first trie and corresponding minimum cost matches of the second field of the data packet are found;

fourth means, responsive to the second means, for selecting the lowest cost match of the minimum cost matches and for selecting the corresponding reference to one of the output data links; and fifth means, responsive to said fourth means, for routing the data packet to the output data link referenced by the lowest cost match of the minimum cost matches.

23. The device of claim 22, wherein at least one of the second tries (T2A) associated with a record (R1) in the first trie comprises at least one record containing a switch pointer pointing to a second trie (T2B) having a top record associated with ancestor record (R2) in the first trie, and further wherein:

the third means comprises means for backtracking up the first trie including means for following the switch pointer from trie T2A to trie T2B.

24. A device for routing a data packet having at least a first field and a second field, the device comprising:

an input data link;

a plurality of output data links;

memory for a routing database;

first means for mapping a filter database B comprising N filters into a rectangular hash table T in the memory, where each entry T[i,j] contains all filters F matching i symbols of the first field and j symbols of the second field of a data packet, including records containing associated costs for the filters of F;

second means coupled to the input data link and the memory for receiving the data packet and, for each pair of values i and j in hash table T in memory, extracting i symbols from the first field of the data packet and j symbols from the second field of the data packet and finding a matching entry in hash table T corresponding to a filter matching the i symbols of the first field and the j symbols of the second field of the data packet and determining the cost associated with each matching filter;

third means, responsive to the second means, for selecting the matching filter having the least cost; and fourth means, responsive to the third means, for routing the data packet to the data link corresponding to the matching filter selected by the third means as having the least cost.

25. A device for routing a data packet having at least a first field and a second field, the device comprising:

an input data link at which the data packet arrives;

a plurality of output data links;

memory for a routing database containing a rectangle of tuples having r rows and c columns and associated filters;

first means for selecting tuples of the rectangle of tuples, initially a lower left corner tuple;

second means, coupled to the first means, the memory, and the input data link, for receiving the data packet and for searching the memory for a filter keyed by bits of fields of the data packet corresponding to the current tuple;

third means, coupled to the first means and responsive to the second means, for causing the first means to select a next tuple of the rectangle of tuples in an adjacent row above and in a same column as a previously selected tuple when the searching performed by the second means is unsuccessful, and for causing the first means to select a next tuple of the rectangle of tuples in the same row as, and in an adjacent column to the right of the previously selected tuple when the searching performed by the second means is successful;

fourth means, coupled to the second means, for selecting a filter found by the second means having a lowest associated cost; and fifth means, responsive to the fourth means, for routing the data packet to an output data link corresponding to the filter selected by the fourth means.

26. A device for routing a data packet having at least a first field and a second field, the device comprising:

an input data link at which the data packet arrives;

a plurality of output data links;

memory for a routing database containing a rectangle of tuples having r rows and c columns and associated filters;

first means for selecting tuples of the rectangle of tuples, initially a lower left corner tuple;

second means, coupled to the first means, the memory, and the input data link, for receiving the data packet and for searching the memory for a filter keyed by bits of fields of the data packet corresponding to the current tuple;

third means, coupled to the first means and responsive to the second means, for causing the first means to select a next tuple of the rectangle of tuples in a row above and in a same column as a previously selected tuple when the searching performed by the second means is unsuccessful, and for causing the first means to select a next tuple of the rectangle of tuples in the same row as, and in a column to the right of the previously selected tuple when the searching performed by the second means is successful;

fourth means, coupled to the second means, for selecting a filter found by the second means having a lowest associated cost; and fifth means, responsive to the fourth means, for routing the data packet to an output data link corresponding to the filter selected by the fourth means.

27. A device for routing a data packet having bit fields, the bit fields including a destination field, and a source field, the device comprising:

an input data link at which the data packet arrives;

a plurality of output data links;

memory containing a set of filters, each filter either specifying or being replicated so as to specify a specific value of a protocol field, an output port, and an associated cost, and also containing a grid-of-tries data structure including a plurality of tries storing all of the filters;

first means coupled to the memory for dividing the set of filters in memory into four groups in memory, including a first group of filters consisting of filters specifying neither a source field value nor a destination field value, a second group of filters consisting of filters specifying a destination field value but no source field value, a third group of filters consisting of filters specifying a source field value but but no destination field value, and a fourth group of filters specifying both a source field value and a destination value;

second means, coupled to the memory, for constructing in memory, for each group of fields, a corresponding hash table of records of all source field value and destination field value combinations in the group, including concatenated protocol field specifications;

third means, coupled to the memory, for storing, for each record in the hash tables, a pointer to the grid of tries data structure including a plurality of tries storing all filters matching the record;

fourth means, coupled to the input data port and the memory, for searching each of the hash tables for a match to a record keyed by the bit fields within the data packet;

fifth means, coupled to the fourth means and the memory, for searching in memory, for each matching hash table record found by the fourth means, the trie pointed to by the hash table record for a matching entry for the destination field value and source field value of the data packet; and sixth means, coupled to the fifth means and the input data link, for routing the packet to the data port specified by the filter corresponding to a matching entry found in the searches of the grid of tries having a lowest cost.

28. A device for routing a data packet having bit fields, the bit fields including a destination field, and a source field, the device comprising:

an input data link at which the data packet arrives;

a plurality of output data links;

memory containing a set of filters, each filter either specifying or being replicated so as to specify a specific value of a protocol field, an output port, and an associated cost, and also containing a grid-of-tries data structure including a plurality of tries storing all of the filters;

first means coupled to the memory for dividing the set of filters in memory into four groups in memory, including a first group of filters consisting of filters specifying neither a source field value nor a destination field value, a second group of filters consisting of filters specifying a destination field value but no source field value, a third group of filters consisting of filters specifying a source field value but but no destination field value, and a fourth group of filters specifying both a source field value and a destination value;

second means, coupled to the memory, for constructing in memory, for each group of fields, a rectangular database of tuples, the rows and columns of the rectangles corresponding to a number of bits of the destination field, source port field, protocol field, and port numbers that form a hash key for searching a tuple at a specified row and column;

third means coupled to the memory for associating each filter in memory to a unique one of the tuples;

fourth means coupled to the memory for associating a precomputed stored cost and stored filter for each filter in each tuple;

fifth means, coupled to the input data link and the memory, for performing, for each received data packet and for each rectangular database of tuples starting at a last row and first column, a rectangular search for a lowest cost matching filter;

sixth means, coupled to the fifth means, for selecting, of the lowest cost matching filters found by the fifth means corresponding to each rectangular database of tuples, the one of these matching filters having the lowest cost; and seventh means, coupled to the input data link and the sixth means, for routing the data packet in accordance to the matching filter found by the sixth means.

* * * * *